(12) United States Patent
Ozog

(10) Patent No.: US 8,452,976 B2
(45) Date of Patent: May 28, 2013

(54) OPTIMIZED PEER-TO-PEER MOBILE COMMUNICATIONS

(75) Inventor: François-Frédéric Ozog, Adainville (FR)

(73) Assignee: Link Us All, L.L.C., Reno, NV (US)

( * ) Notice: Subject to any disclaimer, the term of this patent is extended or adjusted under 35 U.S.C. 154(b) by 834 days.

(21) Appl. No.: 11/631,797

(22) PCT Filed: Jul. 8, 2005

(86) PCT No.: PCT/US2005/024438
§ 371 (c)(1),
(2), (4) Date: Jan. 29, 2009

(87) PCT Pub. No.: WO2006/010081
PCT Pub. Date: Jan. 26, 2006

(65) Prior Publication Data
US 2009/0144798 A1    Jun. 4, 2009

Related U.S. Application Data

(60) Provisional application No. 60/586,024, filed on Jul. 8, 2004.

(51) Int. Cl.
*G06F 21/00*    (2006.01)
(52) U.S. Cl.
USPC ........... 713/182; 713/183; 713/184; 713/185; 726/13; 726/26; 726/27; 726/28; 726/29; 726/30; 709/218; 709/219; 709/227; 709/228; 709/229; 709/230
(58) Field of Classification Search
USPC .............. 726/1, 26–30, 3, 227–230, 11–14; 713/155–159, 182–185; 709/201–203, 223–230, 709/218–219
See application file for complete search history.

(56) References Cited

U.S. PATENT DOCUMENTS 6,038,233 A * 3/2000 Hamamoto et al. .......... 370/401
6,633,761 B1   10/2003 Singhal et al.
(Continued)

FOREIGN PATENT DOCUMENTS

CN    1384644 A    12/2002
EP    1 089 200    4/2001
(Continued)

OTHER PUBLICATIONS

First Examination Report issued on Aug. 30, 2011 in corresponding Indian Patent Application No. 482/DELNP/2007.
(Continued)

*Primary Examiner* — Thanhnga B Truong
*Assistant Examiner* — Josnel Jeudy
(74) *Attorney, Agent, or Firm* — Buchanan Ingersoll & Rooney PC

(57) ABSTRACT

A customer can control access to information about the customer stored in a database by selecting one or more policies, where each policy specifies conditions and/or rules for accessing information associated with the policy, and for each selected policy the user selects portions of the customer's information for association with the selected policy. The customer can create or specify one or more policies for accessing information. In another method, information about the customer stored in the database includes personal information about customer, including contact information for people associated with the customer, and facts about the customer, e.g., contact information for family members professionals who provide service (e.g. doctor, lawyer, banker), emergency contacts, medical information, for example blood type, allergies, medications, blood type, organ donor status.

28 Claims, 20 Drawing Sheets

U.S. PATENT DOCUMENTS

| | | | |
|---|---|---|---|
| 6,661,780 B2 | 12/2003 | Li | |
| 6,947,406 B2 * | 9/2005 | Ramji | 370/338 |
| 7,233,995 B2 | 6/2007 | Yamaguchi et al. | |
| 7,408,906 B2 * | 8/2008 | Griswold et al. | 370/338 |
| 7,480,723 B2 * | 1/2009 | Grabelsky et al. | 709/228 |
| 7,519,004 B1 * | 4/2009 | Kamity et al. | 370/248 |
| 7,630,986 B1 * | 12/2009 | Herz et al. | 1/1 |
| 8,181,249 B2 * | 5/2012 | Chow et al. | 726/23 |
| 2001/0016492 A1 | 8/2001 | Igarashi et al. | |
| 2002/0194378 A1 * | 12/2002 | Foti | 709/246 |
| 2003/0014623 A1 * | 1/2003 | Freed et al. | 713/150 |
| 2003/0225864 A1 * | 12/2003 | Gardiner et al. | 709/220 |
| 2004/0054919 A1 | 3/2004 | Duri et al. | |
| 2008/0140847 A1 * | 6/2008 | Almog | 709/228 |

FOREIGN PATENT DOCUMENTS

| | | | |
|---|---|---|---|
| JP | 2003-078545 | * | 3/2003 |
| WO | WO 02/073864 | | 9/2002 |

OTHER PUBLICATIONS

Chinese Office Action issued in corresponding Chinese Application No. 200580029826.X dated Sep. 19, 2008.

Extended European Search Report dated May 31, 2012 issued in coresponding European Application No. 05769219.6.

International Search Report dated Nov. 29, 2009 issued in corresponding International Application No. PCT/US05/24438.

Office Action issued Aug. 25, 2011 in corresponding Chinese Application No. 200910206596.X, and English translation thereof.

Office Action issued Nov. 19, 2012 in corresponding Chinese Patent Application No. 200910206596.

* cited by examiner

Excerpt MAP information

| Common MSUs identifier | |
|---|---|
| Column Title | Long Title |
| ANumber | A B-M SISD N number |
| ANumberNature | A br B-nature of M SISD N |
| APN | APN Access point name |
| APNLength | APN Length, Access point name length |
| BarrList | Barring of outgoing informational calls |
| Bnumber | B- number address |
| BNumberNature | B- Nature of called M SISDN number |
| CalledNumberingPlan | B- numbering plan of address |
| CalledPartySSN | Called SSN: of SCCP global title |
| CallingNumberingPlan | A or B numbering plan of address |
| CallingPartySSN | Calling SSN of SCCP global title |
| CdNatureSccp | Called nature of SCCP address from global title |
| CellIdentity | Call identity |
| CgNatureSccp | Calling nature of SCCP address from global title |
| CgSccpAdd | Calling Sccp Address from Global Title |
| CmlPhs | CAMEL phases |
| Cnumber | C number address |
| CNumberNature | C nature of address |
| CNumberType | C number type |
| Direction | Way |
| DTID | Destination transaction ID |
| HlrNumber | Home location register number |
| IMEI | International Mobile Equipment Identity |
| IMSI | International Mobile Subscriber Identity number |
| LAC | Localization area code |
| Link | Signaling link |
| Lmsi | Local mobile subscriber identifier |
| MCC | Mobile country code |
| MNC | Mobile network code |
| MacNumber | Mobile switching center number |
| OPC | DPC destination point code |
| OPC | OPC originating point code |
| ServerIdentifier | |
| SIO | SIO Service information object |
| SMSLength | Length of short message |
| SMSMessType | SMS transfer protocol message type indicator |
| Tmsi | Temporary mobile subscriber identifier |

FIG. 26

OPTIMIZED PEER-TO-PEER MOBILE COMMUNICATIONS

This application claims priority to U.S. Provisional Application No. 60/586,024 filed on Nov. 8, 2004, which is hereby incorporated by reference.

BACKGROUND INFORMATION

Summary

A method for controlling access to personal information via a wireless network includes receiving a first selection from a customer with respect to a policy, wherein the first selection indicates portions of information relating to the customer for association with the policy, wherein the information is stored in a database, and receiving a second selection from a customer wherein the second selection indicates a policy that specifies conditions and/or rules for accessing from the database information that relates to the customer and is associated with the policy.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements.

FIG. 26 illustrates exemplary information gathered and/or generated by the fraud detection system.

DETAILED DESCRIPTION

Figure 1:
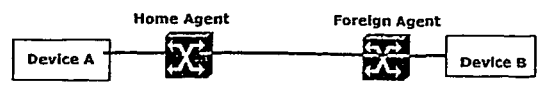
FIGS. 1-3 illustrate portions of a communication network.

This document describes a number of techniques that allow integration of mobility within IP protocol. Exemplary goals of those techniques are to: optimize routing and mobility management for IP v4 (roaming, handoff); securely implement Dynamic DNS across authority domains; and introduce network initiated IP address assignment (incoming call in situations where remote target has a name but not yet an IP address)

Each technique may be the base of a number of patentable technologies. Implementations may just leverage existing software such as Network Interface Card drivers without modifications or may require specific handling from either the software drivers, network routers or access points (wireless or wired).

IMPORTANT NOTE: While the inventions variously described herein define technologies to handle mobility and wireless radio networks, they can also be used to optimize static wired connections.

Mobile NAT

Background of the Invention

Data networks and The Internet in particular are constantly evolving in terms of architecture and method of access.

Today, there are three main access methods:

1. permanent enterprise connections (T1s, satellite . . . );
2. permanent personal connections (ADSL, cable modems, satellite)'
3. on-demand connection (dialup, WLAN).

The permanent enterprise connection is offered under a contract that does not identify specific individuals but rather an enterprise site and traffic characteristics that may vary over time (advent of provisioning).

The permanent personal connections are offered under a contract that identifies an individual, a site and a quite static set of traffic characteristics.

The on-demand connections are offered under a contract that identifies an individual but no site or traffic characteristics.

To communicate over such networks, an IP address must be assigned to be able to transmit and/or receive traffic. IP address can be statically or dynamically assigned, public or private.

A device in a Private Network (corporate or home) with a private IP address cannot be accessed directly from the Internet but can be from within the private network. Network Address Translation (NAT) operated by a firewall or another type of gateway can enable a device with private address to be used from the Internet.

A device that is using the dynamic address assignment may or may not bet accessed from other devices: if the device is not connected, it cannot be accessed. An IP address can be viewed as a unique identifier for a point of connection in the network.

On-demand connections usually make use of dynamic assigned IP address while permanent connections usually make use of statically assigned IP addresses.

This addressing scheme is very effective when the devices are not mobile but raise a number of issues when devices move.

The key issue is that when a device moves it may need to change its access point to the network and hence change of IP address (remember an IP address does not identify a device but a connection point in the network). Changing the IP address in itself is not really an issue but as under the current socket paradigm applications use the IP address to identify a remote peer, a change of IP address result in losing application connectivity.

Moving a device means either:

change of access network: from corporate LAN to GPRS or 3G; from dialup to WLAN . . . ;

change of access point in the same network: from one WLAN Point of Presence to another one; or on-demand re-establishment: after a connection is lost (occurs sometimes in PSTN dialup) and the connection is re-established.

Each move described above results in new IP address assignment and hence, loss of application connectivity.

There are three exemplary approaches to solve the problem:

1. make sure application can accept IP address changes;
2. implement Classless Inter-Domain Routing (CIDR) for the global Internet;
3. mask the IP address change to applications.

The first approach can work for a very limited number of applications such as a WEB browser. However, even for WEB browsers, the solution does not work when using secure connections (https) and is not fully transparent.

For instance, the IP address change is transparent only if the change occurs after a page is completely displayed. If the IP address change occurs in the middle of the transmission of a page, the page display is stopped. This does not take into account session cookies or identifiers.

The second approach is absolutely not realizable. The current Internet core routers are able to handle a maximum of approximately 75,000 routes with an acceptable convergence time. Using CIDR for mobility will bring this number to potentially over a billion if we consider that in some near future, all phones will be IP capable.

So the Telecom community has investigated a number of ways to mask the IP address change to applications at BOTH sides of the connection.

To illustrate the concept, let's assume applications in Device A and Device B are communicating and that Device B's IP address is 1.1.1.1. Applications on Device A think device B IP address does NOT change over time. Conversely applications on Device B think the IP address of the device is 1.1.1.1 and that it does NOT change over time.

All of them introduce some sort of external proxies that hides the mobility of a remote IP device to other IP devices:

For device A to think that applications on Device B does change of IP address, the Home Agent is introduced and acts as a proxy.

For Applications on Device B to think that device B address does not change of IP address, a "Foreign Agent" is introduced and acts as a proxy, as shown for example in FIG. 1.

The Foreign Agent role can be either played by a network node in the visited network (IP address effectively does not change) or by a local piece of software in Device B.

Figure 2:
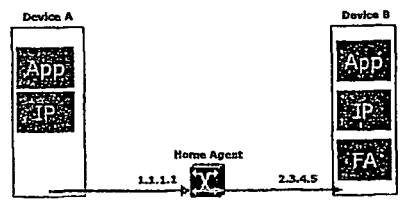

In FIG. 2, the Foreign Agent is in Device B. Traffic goes from Device A to Home Agent, tunneled to Device B Foreign Agent (FA in the drawing), de-tunneled by the Foreign Agent and delivered to the IP stack and then to the application.

Figure 3:
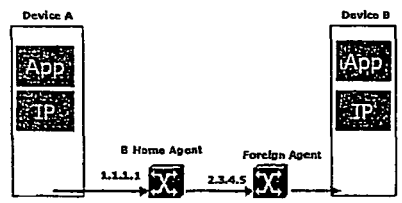

In FIG. 3, the Foreign Agent function is hosted on a network node (usually a router or a firewall) on the visited Network. The visited network must also implement CIDR internally to support the routing to Device B.

In both cases there is a need of a piece of software in the mobile device (Device B in our example) that informs the Home Agent of the selected "Care-Of" address (2.3.4.5 in our example).

The first option allows usage of Mobility without relying on deployment of mobility technology in all IP networks but does not incur huge irrecoverable packet loss when changing access points.

The second option may leverage collaboration between Foreign Agents to avoid packet loss. This is the option taken by 3GPP in its architecture (3GPP standard 25.936) where the forwarding is actually implemented as "bi-casting". This technology sends packets twice to the end-station minimizing possibility of packet loss.

Figure 4:
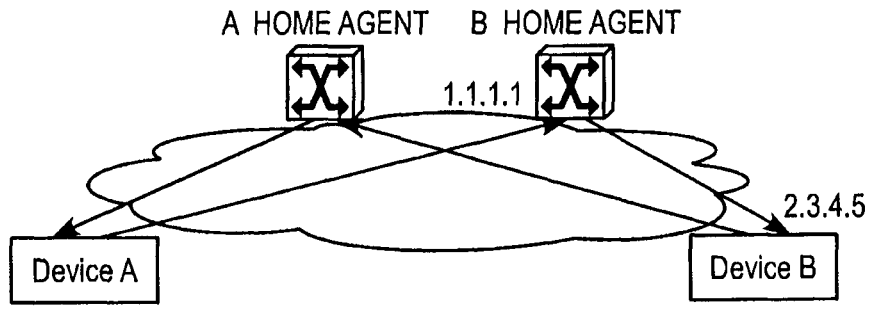
FIG. 4 illustrates an exemplary communication procedure in a network.

When BOTH originator and recipient devices are mobile as shown in FIG. 4, (Device A and B in our example), the traffic is relayed by respective home agents resulting in asymmetric traffic routing (Network Route from A to B is not the same from B to A).

In the example shown in FIG. 4, both devices (A and B) are mobile and have a Home agent. Traffic from A to B goes through "B's home agent" and traffic from B to A goes through "A's home agent".

This situation is far from optimal from both a cost and capabilities perspective. In particular, interactive media can become difficult or impossible.

Let's assume device A is owned by Bob, subscriber of Operator A from Seattle and device B is owned by Dan, subscriber of Operator B from Chicago. They both are in New York and want to have a conference call. The traffic will go from New York to Chicago to Seattle back to New York from Dan to Bob and from New York to Seattle to Chicago to New York from Bob to Dan. In this situation, it is impossible to guarantee an acceptable delay and jitter so that conversation is possible. This does not prevent streaming media one way as local buffers will mask both delay and jitter.

In all known implementations, the home agent tunnels the traffic to the destination. This means that it encapsulates packets into other packets. The result is that to send one big packet, two packets must be generated to comply with "Maximum Transfer Units" of the underlying media. On a fixed line connection it impacts performance but is not a major issue.

But with Wireless access methods such as 802.11, sending two packets instead of one has tremendous implications: Battery life is wasted and wireless access points support far less concurrent users.

Devices need to collaborate to access to the media, so sending two packets instead of one result in increase of the access to media delay by a factor of two. Which really translates in less concurrent users per access point. Another aspect is that it consumes twice the power to transmit the data from a mobile device, and hence waste a very precious resource in mobile devices.

In accordance with an exemplary embodiment of the invention, Mobile NAT, two complementary solutions are defined to enhance mobility support in IP networks:

Full mobility support. This solution assumes introduction of technology in both ends of the communication. In the previous examples, this means that both device A and B have mobility extension software installed. This solution does NOT make use of any static home agent.

Legacy support. This solution introduces a home agent to avoid addition of software in existing devices (mail and web servers in particular).

Mobile NAT relies on local Mobility proxies installed at each side of an IP dialog (connectionless or connection orientated). While not technically correct, Mobile NAT can be described using the terminology used in "standard" IP mobility described earlier:

Home Agent is located in the devices themselves rather than being a network node in the home network and the Foreign Agent is located in the devices.

The traffic between the Home and Foreign Agents is "Translated" rather than tunneled.

Optionally some network nodes can participate and introduce the concept of bi-casting introduced by 3GPP to minimize packet loss during mobility events.

Exemplary embodiment of the invention can be applied in two broad contexts (but not limited to):

Wireless LAN on diverse radio technologies: 802.11, Bluetooth, 802.16 . . . ; and Data traffic on Cellular networks: GPRS, W-CDMA, CDMA2000 . . . .

The difference between the static Home Agent and mobile Home Agent approaches is subtle but its consequences in terms of operational costs, efficiency and performance are far reaching.

Lets have an overview of the mechanism.

Figure 5:
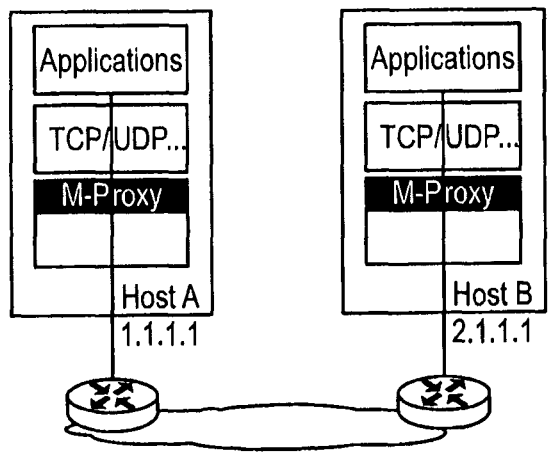
FIGS. 5-6 illustrate operation of mobile phones in a network.

In the example shown in FIG. 5, host A (current IP address 1.1.1.1) sees host B (current IP address 2.1.1.1) as being the host 254.1.1.1. This address, locally unique to host A, is never seen outside. It is being assigned so that applications continuously access host B through this proxied address (254.1.1.1) even if the real address for host B changes. One of the roles of the proxies is to collaboratively maintain each other consistency of translation from local to current address.

After some time, host B roams to a new network and gets a new IP address: 3.3.3.3.

Figure 6:
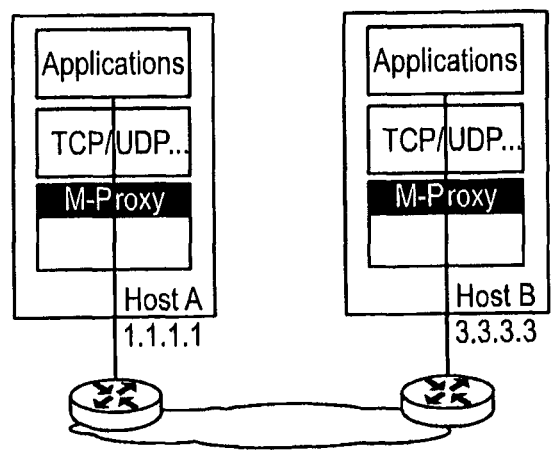

As shown in FIG. 6, host A will continue to transparently talking to host B (local address 254.1.1.1, translated to 3.3.3.3 by the local proxy).

It is important to note that the proxied address (254.1.1.1) is purely local to host A. Other hosts may obtain other addresses.

Translations are valid until:

the device shuts down; or

There are no more opened sockets in the device.

Using a translation has many advantages. For example:

It does not induce fragmentation that occurs when tunneling IP and hence allows Wireless Access point to share the available radio spectrum between the maximum number of users; and It allows for the best path to be found between the two devices, avoiding un-necessary hops to "home or foreign" agents. This is of high importance for 2-Way interactive traffic (telephony, push-to-talk, audio-conference, video-conference . . . ).

As the system is essentially distributed it does not introduce scalability issues, especially in the global Internet. IETF and the like Mobile IP Home Agents concentrate thousands if not more IP dialogs and constitute a fragile link in the IP path and also a limitative factor.

The following paragraphs detail various mechanisms to install and manage the mobility.

Technical Description

Mobility Management

Mobility management is about keeping the applications running as the devices move. The move can be "small" and handled by micro-mobility techniques and it can be "large" and handled by macro-mobility techniques.

Micro-Mobility is about keeping the same IP address but changing of radio access point. Wireless LANs and GPRS/3G networks use a number of techniques outside the scope of this document handle this type of mobility.

Macro-Mobility is about keeping the applications running while one or both sides of a dialog change IP address. This case is handled by the invention.

The move can happen with or without loss of connection during the transition. The loss of connection can result from loss of coverage, change of access card on the device, standby mode.

Figure 7:
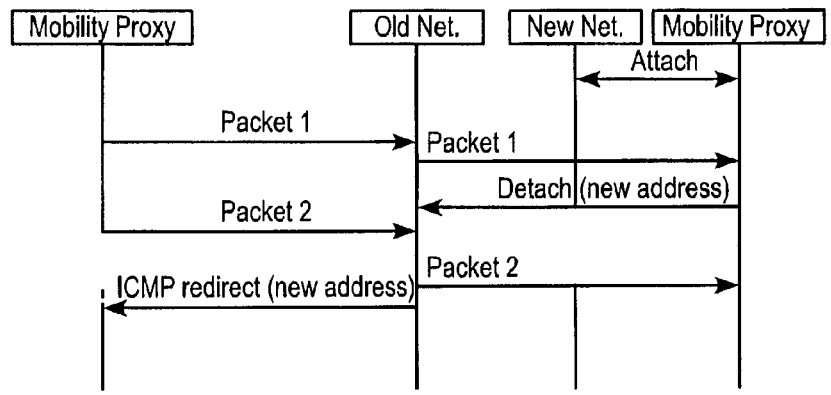
FIG. 7 illustrates an exemplary communication procedure.

FIG. 7 shows a structure where there is no loss of connectivity between Access Points.

When the moving device is still in the "old network" it constantly monitors radio sources to decide when to switch to a new access point. The techniques and policies to change are outside the scope of the document.

In the described scenario, the mobile device decides that it should attach to a new network point (either in the same operator network or in another one). While IP traffic still transits from old network, the mobile device attaches to the new access point.

At this point, depending on the device capabilities, the device has either two IP addresses or just one. The invention accommodates both situations, the better being having two IP addresses to avoid packet losses.

In the case the device can have two IP addresses "Packet 1" in the above example will get to its destination as planned. In the other case, it will be lost.

After attaching to the new network, the mobile device detaches from the old network.

This results in removing the IP address on the mobile device and informing old network devices (not only the radio access point).

The old network nodes can optionally use this information to avoid packet loss to the mobile device and also inform sending nodes that the mobile device moved.

To avoid packet loss (in the above example to ensure "Packet 2" reaches its destination), the network nodes can use forwarding techniques or bi-casting (3GPP 25.936).

Forwarding is done with an additional NAT operation to change the destination IP address to the new one (obtained at the detach process).

Bi-casting sends the packets both to the old address and the new one (using the above NAT forwarding mechanism). This covers cases where radio signals are weak and the mobile device keep on changing access points.

Lastly a network node in the old network can optionally inform senders that the mobile device moved using standard ICMP messages. This ensures fast convergence of mobility and optimal use of network node CPU (limit the forwarding actions to a minimum).

Figure 8:
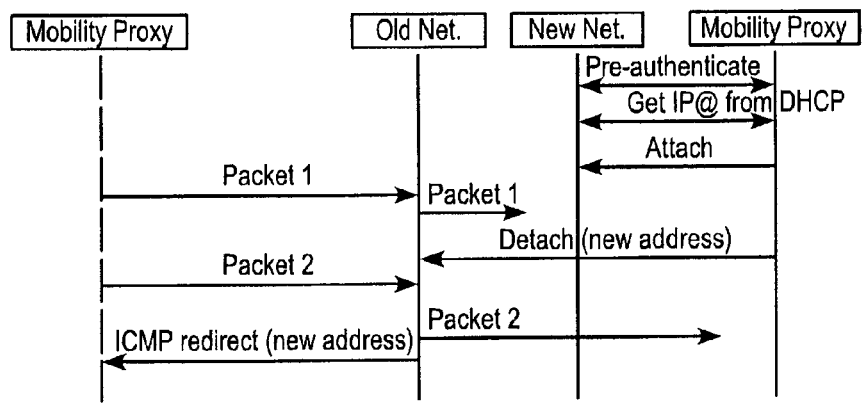
FIG. 8 illustrates an exemplary communication procedure.

FIG. 8 illustrates loss of connectivity between Access Points.

Dialog Initiation

The previous paragraph described what happens for the established traffic exchanges. Dialog establishment should also be covered to see optimization of Mobility handling.

The key concept behind this is to make sure a device takes appropriate actions to handle the mobility of the mobile devices to which it "talks". Such actions include adaptation of timeout thresholds, change of cache policies . . . . In short all mechanisms that allow detection of mobility events to achieve efficient seamless reaction.

Detecting that a remote end is mobile can be achieved using diverse techniques:

RFC 1349 extension: Upon receiving an IP packet with bit 7 of Type of Traffic set to 1.

DNS query: Upon receiving an IP packet from an unknown source, an extended DNS service is queried about the remote end Mobility state.

Conversely, informing remote ends that the sending device is or may be mobile is done through various techniques:

RFC 1349 extension: setting bit 7 of Type of Traffic set to 1 of every outgoing IP packet.

DNS query: Registering special capabilities to an extended DNS service.

Address Translation

This section is based on Network Address Translation techniques:

RFC 1631, The IP Network Address Translator (NAT)

RFC 2663, IP Network Address Translator (NAT) Terminology and Considerations

Allocation of a standard specific range (254.x.x.x) from ICANN can be sought, to ensure proper handling of all stacks.

Home Network Registrar

Background of the Invention

The Domain Name System (DNS) is used to name IP addressable devices by a simple name. It also defines a hierarchy of names and multiple authorities to handle the management. Sample Domain names are "ibm.com", "Microsoft.com".

Root domains such as (com, net, biz, org) are handled by authorities designated but the ICANN authority. Then assignment of names (and associated IP address translations) within the second level domain is under the authority of the assignee. For instance, IBM Corporation owns the second level domain "ibm.com" and can freely assign names and other domains under "ibm.com": www.ibm.com, www.rd.ibm.com . . . .

Due to the introduction of dynamic IP address assignment, DNS has been extended to support automatic updates of translations (Dynamic DNS) and further extended to support authenticated updates.

Those mechanisms work perfectly under the authority of a single entity (i.e. on the Intranet of one corporation) but cannot be used to name personal devices in public IP networks.

A number of companies (dynip.com) implemented some kind of workaround technologies but with limited flexibility and without scalability to support a scenario where mobile devices (such as phones and PDAs) can be named following a convention such as "devicename.owner.operator.com".

Hurdles to solve include:

Authenticated updates when the device is used in a "roamed" network and the IP address is assigned by a "foreign" access point. It is impossible to maintain the authorized list of all access points world wide that are allowed to update the home DNS;

There are more than 1 billion of users and the number of associated devices may grow over 2 billion.

Description of the Invention

Overview

In an exemplary embodiment of the invention, the Home Network Registrar, builds on the architecture found in voice cellular networks to solve the problem.

When devices obtain their IP address from the local access point, it is their responsibility to update the registrar. Authentication is ensured between the device and the registrar.

The HNR also provides the extended DNS service described with respect to Dialog Initiation.

Figure 9:
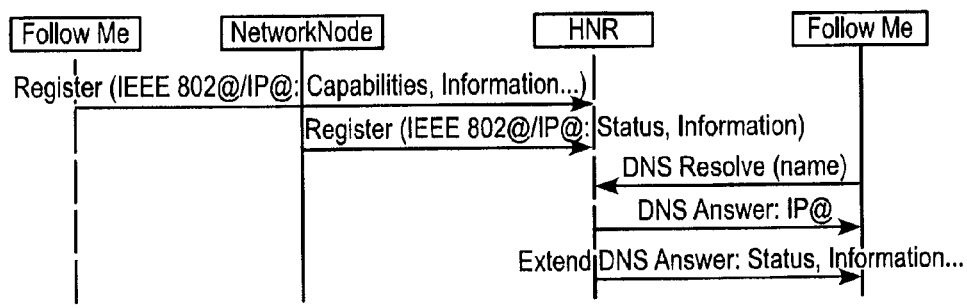
FIG. 9 illustrates an exemplary communication procedure.

FIG. 9 illustrates an exemplary procedure.

Figure 10:
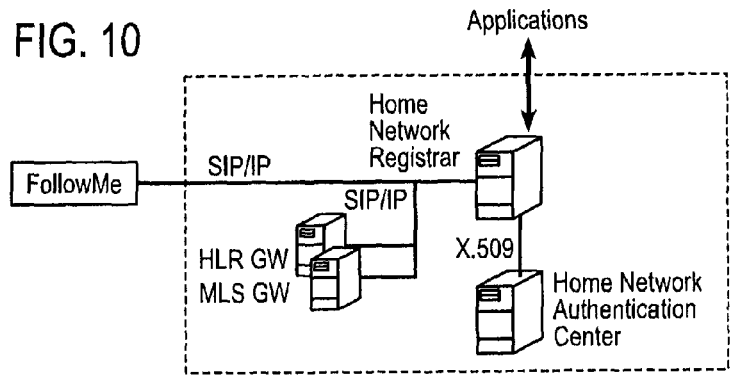
FIG. 10 illustrates an exemplary communication network structure.

FIG. 10 illustrates an exemplary structure, wherein the HNR is maintained up to date by both network nodes that have some knowledge about the registered devices and by the device itself.

The HNR is the focal point for Operational Network Presence Information updates. A HNR is a logical entity composed of multiple Agents and Repositories. It can be integrated in a broader framework, the PresenceTone framework, to build Presence enabled applications.

The HNR meets carrier grade criteria:

Built to support up to 100 million (one hundred million) PresenceTone Users;

99.999% service availability;

Rich Operations, Administration and Maintenance; and

Non-Stop Framework evolution: among other features, new or updated versions of events can be dynamically loaded with no impact on the service.

HNR also provides rudimentary protection against denial of service attacks and will eventually collaborate with Firewalls to ensure proper protection.

Figure 11:
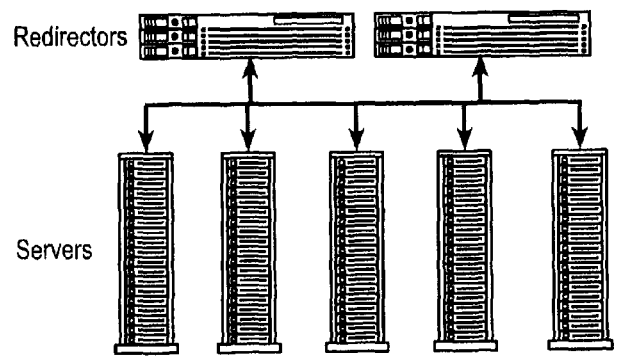
FIG. 11 illustrates an exemplary portion of a communication network.

FIG. 11 illustrates exemplary connections between redirectors and servers.

The number of HNR subscriber repositories is a choice of the operator. Due to database performance aspects it is considered that there should be up to 1M subscribers per repository but there are no limitations in having more subscribers per repository.

Routing by top-level redirectors is achieved by a calculation on the user ID (hash code, first letters, proprietary function . . . ).

The number of HNR agents associated to ONE repository can be from 1 to 20 agents per repository according to traffic.

Agents and repositories are grouped into rack. The top-level redirectors accomplish routing update traffic to the appropriate server. Routing to the appropriate Agent within a server is accomplished through collaborative work between agents as local re-directors.

Figure 12:
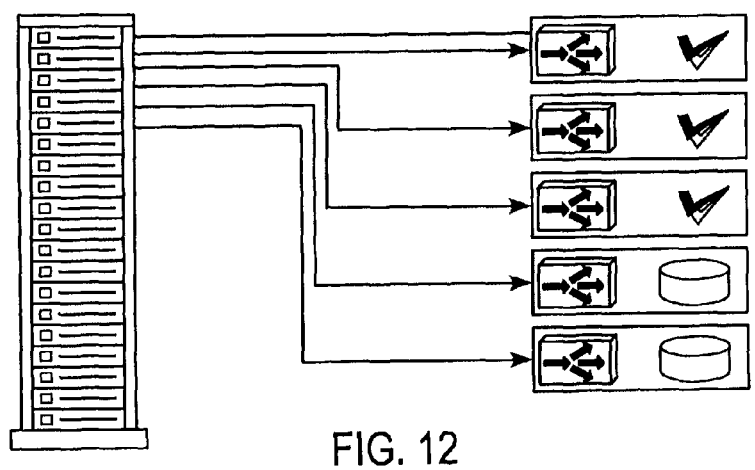
FIG. 12 illustrates an exemplary portion of a communication network.

FIG. 12 illustrates an HNR composed of two repositories (for redundancy purposes) and three agents integrated in a rack Repositories and Agent may be located in different operator network depending on the security requirements. It is expected that the agents will be visible entities on the public side of a DMZ while repositories and other components are in the protected zone.

Each node (agent/repository) has a redirector component that allows:

Automatic discovery of peers;

Election of a cluster representative and backup representative (leveraging OSPF protocol); and Redirection of inbound traffic based on load among other criteria.

Figure 13:
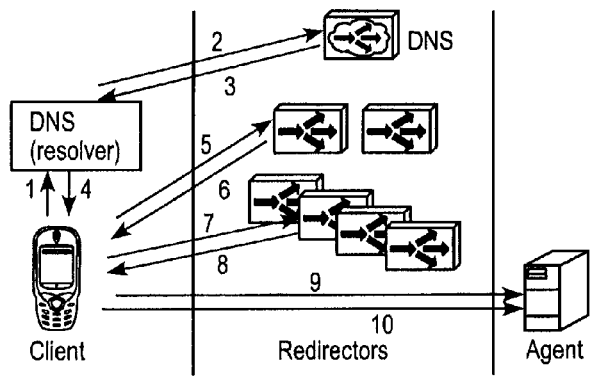
FIG. 13 illustrates an exemplary sequence of events in a mobile communication network.

FIG. 13 illustrates an overall sequence of events, assuming that the IP connectivity has been established, as illustrated below:

0. FollowMe sends a SIP Message to a SIP address. Assuming that the Client never sent a SIP message, it needs to resolve the name for the HNR Agent;

1. Request a DNS authoritative answer for <network> with SIP SRV record type to the local DNS resolver (avoid cache in the local DNS server);

2. Forward request;

3. The DNS server in the home network resolves it to the least busy SIP Inbound Redirect Server and sends answer back;

4. Forwards answer;

5. Send the SIP message to the Inbound SIP Redirect Server;

6. Inbound SIP Redirect Server sends back redirection information (SIP 302 Response) so that the FollowMe Client goes to second level redirection (depends on the size of the network);
7. Send the SIP message to the second level SIP Redirect Server;
8. SIP Redirect Server sends back redirection information (SIP 302 Response) so that the FollowMe Client goes to HNR Agent: <agent>.<network>.
9. Client sends the message directly to <user>@<agent>.<network> (DNS resolution not shown); and
10. Subsequent traffic goes directly to the agent.

Home Network Registrar/Call Management

Background of the Invention

As described herein, devices that have on-demand connection to networks, do NOT have an IP address all the time. Hence they are not accessible all the time.

In theory such devices cannot be used as servers or cannot be called by interactive media applications such as telephony applications using voice over IP.

One way (in theory) to "solve" the problem is to maintain IP address connectivity at all times. But there are not enough addresses available to allow that in a public network scenario (not counting the fact that the address need is doubled if using "standard" Mobile IP solution with a home agent). Furthermore it wastes operator resources, dries battery power and complicates billing.

Description of the Invention

Overview

Exemplary embodiments of the invention builds on the Home Network Registrar described in 2.

It is assumed that: devices are assigned some unique identifier, independent from IP address. In particular, the IEEE 802 address of a LAN or WLAN card can be used as such identifier; and devices are assigned a unique name in a DNS format.

In this exemplary embodiment, invention, devices and HNR collaborate to allow devices to be "woke up" when necessary.

Technical Description

Lets take a 802.11 WLAN typical example.

Communication between WLAN interface cards in devices and WLAN access points can be done at different states, in particular:

Un-authenticated;
Authenticated; and
Associated.

The only state in which devices have an IP address and can send/receive traffic is the associated state. In other states, only management traffic is allowed.

As WLAN cards "scan" for new access points using "PROBE" layer 2 datagrams, Visited Network Registrar intercepts the messages (DS function of 802.11) and update the HNR with relevant information.

Figure 14:
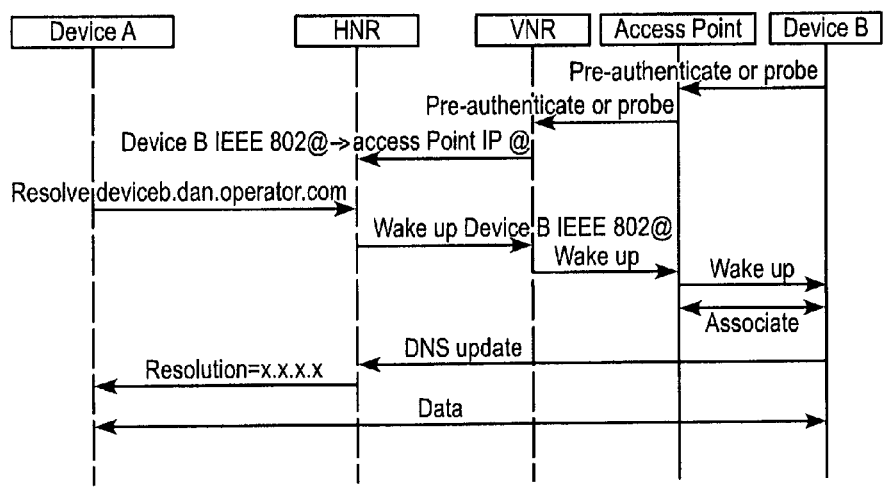
FIG. 14 illustrates an exemplary sequence of events in a mobile communication network.

When a resolution request is received and there are no current IP address, the HNR requests the VNR to wake up the device, i.e. ask the device to authenticate, get an IP address and report it, as illustrated for example in FIG. 14.

Security considerations:

Mobile NAT does not intend to be more secure than the underlying networks; and

IP VPN or transport security mechanisms such as HTTPS can be used transparently between two end points.

REFERENCES

IETF RFC 791, Internet Protocol;
IETF RFC 792, Internet Control Message Protocol;
IETF RFC 903, A Reverse Address Resolution Protocol'
IETF RFC 1349, Type of Service in the Internet Protocol Suite;
IETF RFC 1631, The IP Network Address Translator (NAT);
IETF RFC 2002, IP Mobility Support;
IETF RFC 2332, NBMA Next Hop Resolution Protocol (NHRP);
IETF RFC 2344, Reverse Tunneling for Mobile IP;
IETF RFC 2520, NHRP with Mobile NHCs;
IETF RFC 2663, IP Network Address Translator (NAT) Terminology and Considerations; and
3GPP 25.936 Handovers for real-time services from PS domain.

With respect to voice over Wireless IP, there are two broad kind of multimedia applications: interactive (telephony, push to talk) and send (watching a clip or listen to a radio). For send-type applications to work properly, the viewing side needs to mask the delays between multimedia packets so that the playing is smooth. Usually this is done through buffering techniques. The delay between multimedia packets varies over time and this variation is called jitter. Jitter is a result of network conditions and also from radio access protocols in wireless networks. So the buffers are calculated to absorb the maximum observable delay between packets.

For interactive-type applications, not only jitter but also transit delay is important. The transit delay is how long it takes a packet to traverse the network from source to destination. So interactive are more demanding that send-type applications.

The consequences for instance are that one-way streaming of video traffic works well in GPRS environments but push-to-talk is almost impossible on the same network.

The key issue for push-to-talk in GPRS network is up-link radio access. When a device needs to send an IP packet, it must obtain authorization for the network. Authorization is obtained through dialog over a special signaling channel. The net result is that it may take up to 3 seconds worst case and an average of 1 second to be able to send a packet. This translates to 1 second "silences" in a conversation. As a comparison the design guidelines for circuit switched transatlantic delay variation are to keep the jitter below 120 ms . . . .

The same applies to radio networks such as 802.11 but as the negotiation speed is way faster push-to-talk is possible. However, when the number of users associated to an access point grows, the delay to obtain the right to emit packet also grows to a point that voice interactivity is not possible.

Hence some companies have built new negotiation techniques to introduce some kind of priority to voice packets and protect delay sensitive traffic. Companies such as Symbol have a patent in the area.

Another exemplary embodiment of the invention (**2).

Mobile networks are by essence the most dynamic computing constructs ever built and are used continuously by over a billion of people. The Internet may generate more traffic in terms of volume but its usage pattern is far less dynamic and interactive than mobile networks (for instance on most European markets, people are connecting four times a week on average, totalizing two hours connection time).

Surprisingly, mobile networks do not proactively assist its users or its managers:

When a user fails configuring its GPRS handset or accessing an Internet resource, the network detects the issue but the customer support department is not informed and cannot take measures to avoid frustration.

Fraud detection solutions are essentially done offline mainly because event collection from multiple applications could jeopardize network behavior and the lack of a generic event "sharing" framework.

Initiatives focusing on definition of "user profile" have flourished in standards bodies and in the industry. Those efforts intend to rationalize information internally to reduce operational costs, ease introduction of services and ease publication of a subset of such collected information to third parties.

In the mean time, little attention has been dedicated on providing a foundation to leverage the events generated by the network to enhance user experience, tighten control over the network and introduce pro-active services. Luckily, a standard event protocol has been defined in addition of being used in 3GPP: SIP. Event packages for IMS as well as instant messaging and presence have been already defined. Further packages can be easily defined and implemented to cover all the needs of telecommunications operators.

LinkUsAll LLC leveraged core technology developed over three years from Versada Networks to build a large scale event generation publication framework. It has been successfully applied to WiFi infrastructure and could be applied more generally to any network, in particular mobile network.

Generic event generation, publication and forwarding ensure secure and cost efficient distribution of events to many applications as well as seamless aggregation and correlation:

While technically feasible, distribution of events from the SS7 network should not be done directly to shield the network from external misbehavior. Hence, while most network elements or probes generate real-time events, they should be handled only by internal trusted systems and then forwarded to less trusted elements.

For instance, rather than services directly integrate with SS7 network probes, network related events (attach/detach/call in progress . . . ) should be distributed by the generic event layer to applications such as fraud management, instant messaging server, presence server . . . .

As it is not acceptable to let each service poll shared resources, event generation allows one component to poll the shared resource and generate and distribute the resulting events to all services that need to consume it.

Publication of events assume controlled distribution according to security and privacy policies both internally (in the operator network) and externally (to trusted third parties). Publication is also about protocol interfaces and software APIs to facilitate consumption of events.

Handling events provides the most effective use of resources to offer, pro-active services and real-time reaction to operational context changes. However, not all applications are built to cope with events. It is thus much needed to describe not only the expected event but also describe the expected behavior when the event triggers.

LinkUsAll have implemented technology to introduce new events in the system. This framework could be extended to cope with behavior description.

Proposal

Provide Orange with all decision making elements regarding generic event handling and with a free of charge license to use core event engine technology from LinkUsAll.

Incentives to Introduce Generic Event Handling

Identify applications of generic event handling that could provide Orange with immediate impact on:

Customer experience
Network control
Proof of concept

Implement a proof of concept platform that illustrate significantly different use cases.

APPENDIX 1

SIP Events

SIP defined a standard framework for subscribing and publishing events. From a design perspective such framework is restricted to events whose frequency is in range of a second. It is not designed to handle events that occur in a nuclear reactor with occurrence frequency of a million times per second.

However, it should be clear that this does not prevent the system from handling a massive number of events. Looking at it more closely, network events for a single subscriber do not occur thousands of times per second!

In other words, SIP event framework can handle millions of events per second, providing such events are attached to millions of different people so that event handling time is consistent with event occurrence frequency.

In another exemplary embodiment of the invention **(3):

This document intends to describe a number of techniques that allows integration of mobility within IP protocol. The goals of those techniques are to:

Optimize routing and mobility management for IP v4 (roaming, handoff)

Securely implement Dynamic DNS across authority domains

Introduce network initiated IP address assignment (incoming call in situations where remote target has a name but not yet an IP address)

Each technique may be the base of a number of patentable technologies. Implementations may just leverage existing software such as Network Interface Card drivers without modifications or may require specific handling from either the software drivers, network routers or access points (wireless or wired).

Mobile NAT

Background of the Invention

Data networks and The Internet in particular are constantly evolving in terms of architecture and method of access.

Today, there are three main access methods:

Permanent enterprise connections (T1s, satellite . . . )

Permanent personal connections (ADSL, cable modems, satellite)

On-demand connection (dialup, WLAN)

The permanent enterprise connection is offered under a contract that does not identify specific individuals but rather an enterprise site and traffic characteristics that may vary over time (advent of provisioning).

The permanent personal connections are offered under a contract that identifies an individual, a site and a quite static set of traffic characteristics.

The on-demand connections are offered under a contract that identifies an individual but no site or traffic characteristics.

To communicate over such networks, an IP address must be assigned to be able to transmit and/or receive traffic. IP address can be statically or dynamically assigned, public or private. A device with a private IP address cannot be accessed directly from the Internet but can be from within the private network. A device that is using the dynamic address assignment may or may not bet accessed from other devices: if the device is not connected, it cannot be accessed. An IP address can be viewed as a unique identifier for a point of connection in the network.

On-demand connections usually make use of dynamic assigned IP address while permanent connections usually make use of statically assigned IP addresses.

This addressing scheme is very effective when the devices are not mobile but raise a number of issues when devices move.

The key issue is that when a device moves it may need to change its access point to the network and hence change of IP address (remember an IP address does not identify a device but a connection point in the network). Changing the IP address in itself is not really an issue but as current applications use the IP address to identify a remote end, a change of IP address result in losing application connectivity.

Moving a device means either:

Change of access network: from corporate LAN to GPRS or 3G; from dialup to WLAN . . . .

Change of access point in the same network: from one WLAN Point of Presence to another one On-demand reestablishment: after a connection is lost (occurs sometimes in PSTN dialup) and the connection is re-established Each move described above results in new IP address assignment and hence, loss of application connectivity.

There are two approaches to solve the problem:

make sure application can accept IP address changes mask the IP address change to applications The first approach can apparently work for a very limited number of applications such as a WEB browser. However, even for WEB browsers, the solution does not work when using secure connections (https) and is not fully transparent.

For instance, the IP address change is transparent only if the change occurs after a page is completely displayed. If the IP address change occurs in the middle of the transmission of a page, the page display is stopped. This does not take into account session cookies or identifiers.

So the Internet community has investigated a number of ways to mask the IP address change to applications.

All of them introduce some sort of external static proxy that hides the mobility of a remote IP device to other IP devices:

Home agent for IETF (RFC 2002, IP Mobility Support)

Home/Foreign agents for Symbol (U.S. Pat. No. 6,535, 493, Mobile internet communication protocol)

Figure 15:
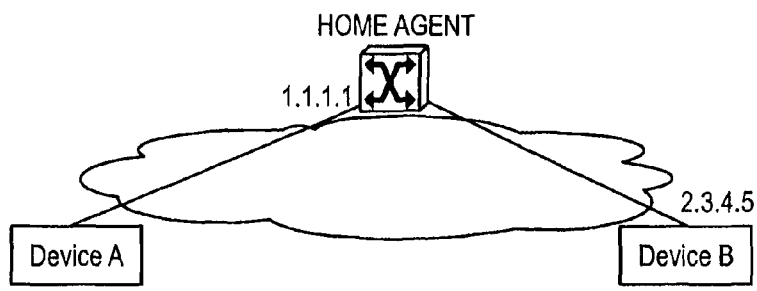
FIGS. 15-21 illustrate an exemplary communication procedures.

In the example shown in FIG. 15, all traffic to Device B transits via its home agent and "appear" to have a static IP address 1.1.1.1.

Figure 16:
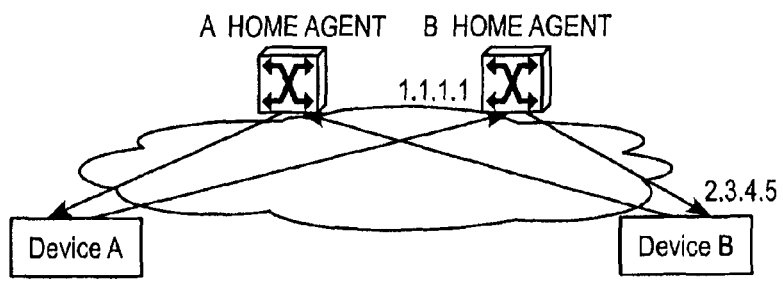

In the example shown in FIG. 16, both devices (A and B) are mobile and have a Home agent. Traffic from A to B goes through "B's home agent" and traffic from B to A goes through "A's home agent".

This situation is far from optimal from both a cost and capabilities perspective. In particular, it is not well suited for interactive traffic such as voice over IP.

In all known implementations, the home agent tunnels the traffic to the destination. This means that it encapsulates packets into other packets. The result is that to send one big packet, two packets must be generated to comply with "Maximum Transfer Units" of the underlying media. On a fixed line connection it impacts performance but is not a major issue.

But with Wireless access methods such as 802.11, sending two packets instead of one has tremendous implications:

Battery life is wasted and wireless access points support far less concurrent users. Devices need to collaborate to access to the media, so sending two packets instead of one result in increase of the access to media delay by a factor of two. This really translates in less concurrent users per access point. Another aspect is that it consumes twice the power to transmit the data from a mobile device, and hence waste a very precious resource in mobile devices.

Interactive media becomes impossible. Let's assume device A is owned by Bob, subscriber of Operator A from Seattle and device B is owned by Dan, subscriber of Operator B from Chicago. They both are in New York and want to have a conference call. The traffic will go from New York to Chicago to Seattle back to New York from Dan to Bob and from New York to Seattle to Chicago to New York from Bob to Dan. In this situation, it is impossible to guarantee an acceptable delay and jitter so that conversation is possible. This does not prevent streaming media one way as local buffers will mask both delay and jitter.

Description of the Invention

In an exemplary embodiment of the invention, Mobile NAT, defines two complementary solutions to enhance mobility support in IP networks:

Full mobility support. This solution assumes introduction of technology in both ends of the communication. In the previous examples, this means that both device A and B have mobility extension software installed. This solution does NOT make use of any home agent.

Legacy support. This solution introduces a home agent to avoid addition of software in existing devices (mail and web servers in particular).

Mobile NAT relies on local Mobility proxies installed at each side of an IP dialog (connectionless or connection orientated).

Figure 17:
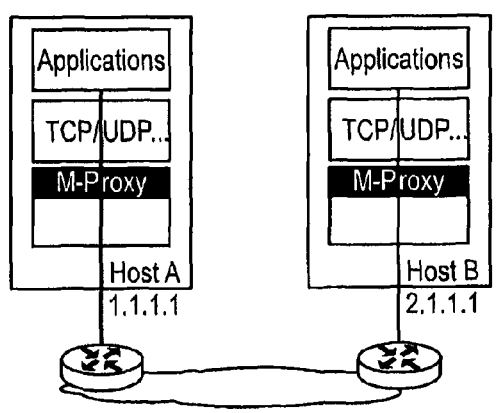

In the example shown in FIG. 17, host A (current IP address 1.1.1.1) sees host B (current IP address 2.1.1.1) as being the host 254.1.1.1. This address, locally unique to host A, is never seen outside. It is being assigned so that applications continuously access host B through this proxy address (254.1.1.1) even if the real address for host B changes. One of the roles of the proxies is to collaboratively maintain each other consistency of translation from local to current address.

After some time, host B roams to a new network and gets a new IP address: 3.3.3.3.

Figure 18:
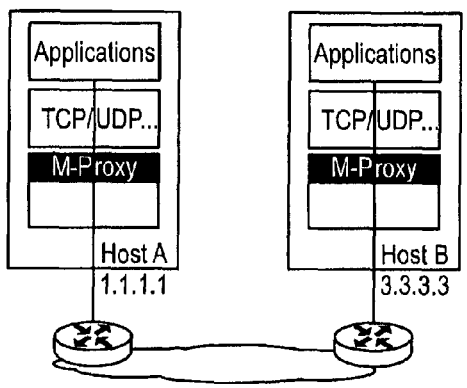

As shown in FIG. 18, Host A will continue to transparently talking to host B (local address 254.1.1.1, translated to 3.3.3.3 by the local proxy).

It is important to note that the proxied address (254.1.1.1) is purely local to host A. Other hosts may obtain other addresses.

Translations are valid until: The device shuts down; and/or

There are no more opened sockets in the device.

Using a translation has many advantages, for example:

It does not induce fragmentation that occurs when tunneling IP; and it allows for the best path to be found between the two devices, avoiding un-necessary hops to "home or foreign" agents. This is of high importance for 2-Way interactive traffic (telephony, push-to-talk, audio-conference, video-conference . . . ).

As the system is essentially distributed is does not introduce scalability issues, especially in the global Internet.

The decision whether or not to install a translation is a non-trivial matter and is covered in the next paragraph.

Then the translation process is described followed by roaming scenarios.

Activation of Mobile NAT

Inbound traffic

Decision criteria

None

Considers every incoming traffic as being potentially mobile

RFC 1349 extension

Figure 19:
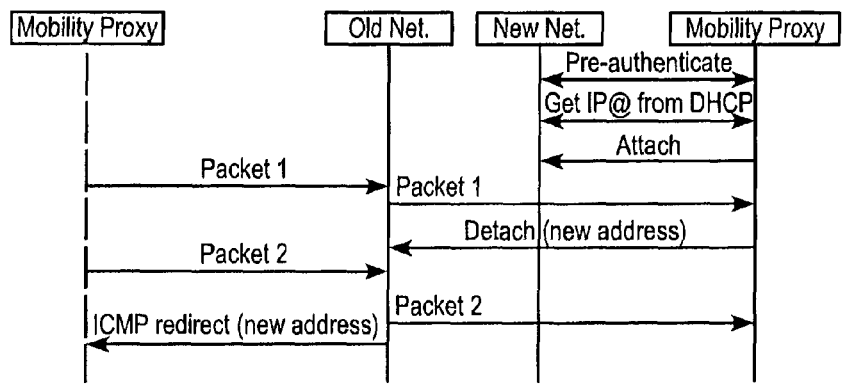
Figure 20:
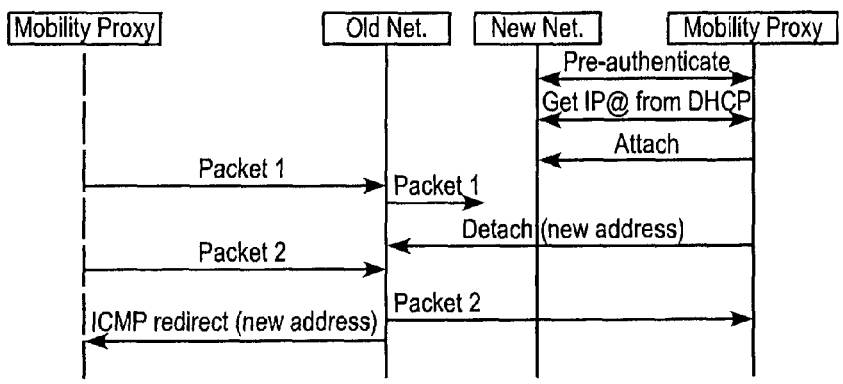
Figure 21:
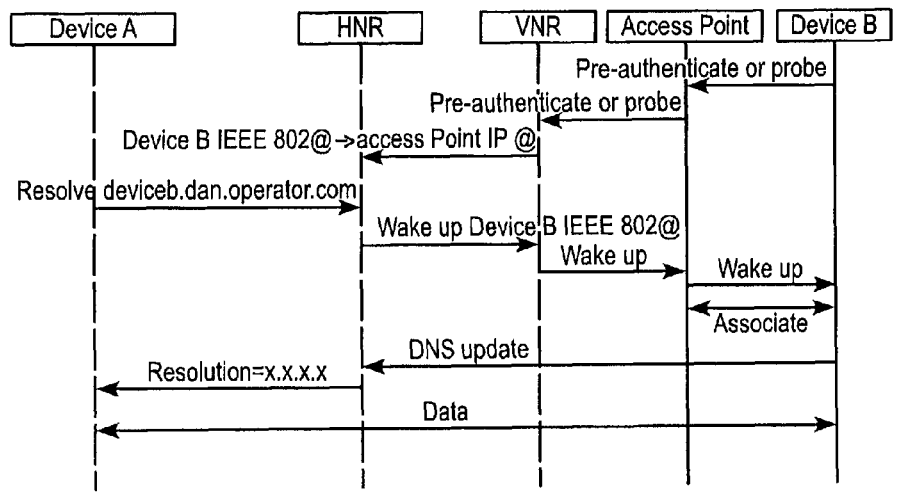

Upon receiving an IP packet with bit 7 of Type of Traffic set to 1.
  DNS query
  Upon receiving an IP packet from an unknown source, the DNS is queried about the remote end Mobility state.
  Obtain locally unique IP Mobility address
  (254.x.x.x)
  Outbound traffic
  Decision criteria
  None
  Consider all remote stations as being potentially mobile
  Address translation
  This section is based on Network Address Translation techniques:
    RFC 1631, The IP Network Address Translator (NAT)
    RFC 2663, IP Network Address Translator (NAT) Terminology and Considerations
    Roaming Handling
  FIG. 19 illustrates exemplary actions where there is no loss of connectivity between Access Points.
  FIG. 20 illustrates exemplary actions where there is loss of connectivity between Access Points.
  Home Network Registrar
  Background of the Invention
  The Domain Name System (DNS) is used to name IP addressable devices by a simple name. It also defines a hierarchy of names and multiple authorities to handle the management. Sample Domain names are "ibm.com", "Microsoft.com".
  Root domains such as (corn, net, biz, org) are handled by authorities designated but the ICANN authority. Then assignment of names (and associated IP address translations) within the second level domain is under the authority of the assignee. For instance, IBM Corporation owns the second level domain "ibm.com" and can freely assign names and other domains under "ibm.com": www.ibm.com, www.rd.ibm.com . . . .
  Due to the introduction of dynamic IP address assignment, DNS has been extended to support automatic updates of translations (Dynamic DNS) and further extended to support authenticated updates.
  Those mechanisms work perfectly under the authority of a single entity (i.e. on the Intranet of one corporation) but cannot be used to name personal devices in public IP networks.
  A number of companies (dynip.com) implemented some kind of workaround technologies but with limited flexibility and without scalability to support a scenario where mobile devices (such as phones and PDAs) can be named following a convention such as "devicename.owner.operator.com".
  The hurdles to solve are:
  Authenticated updates when the device is used in a "roamed" network and the IP address is assigned by a "foreign" access point. It is impossible to maintain the authorized list of all access points world wide that are allowed to update the home DNS
  There are more than 1 billion users and the number of associated devices may grow more than 2 billion
  Description of the Invention
  The invention, the Home Network Registrar, builds on the architecture found in voice cellular networks to solve the problem.
  When devices obtain their IP address from the local access point, it is their responsibility to update the registrar. Authentication is ensured between the device and the registrar.
  Home Network Registrar/Call Management
  Background of the Invention As seen in 1.1, devices that have on-demand connection to networks do NOT have an IP address all the time. Hence they are not accessible all the time.
  In theory such devices cannot be used as servers or cannot be called by interactive media applications such as telephony applications using voice over IP.
  One way (in theory) to "solve" the problem is to maintain IP address connectivity at all times. But there are not enough addresses available to allow that in a public network scenario (not counting the fact that the address need is doubled if using "standard" Mobile IP solution with a home agent). Furthermore it wastes operator resources, dries battery power and complicates billing.
  Description of the Invention
  The invention builds on the Home Network Registrar described in 2.
  It is assumed that:
  Devices are assigned some unique identifier, independent from IP address. In particular, the IEEE 802 address of a LAN or WLAN card can be used as such identifier.
  Devices are assigned a unique name in a DNS format
  In this invention, devices and HNR collaborate to allow devices to be "woke up" when necessary.
  Lets take a 802.11 WLAN typical example.
  Communication between WLAN interface cards in devices and WLAN access points can be done at different states, in particular:
    Un-authenticated
    Authenticated
    Associated
  The only state in which devices have an IP address and can send/receive traffic is the associated state. In other states, only management traffic is allowed.
  As WLAN cards "scan" for new access points using "PROBE" layer 2 datagrams, Visited Network Registrar intercepts the messages (DS function of 802.11) and update the HNR with relevant information.
  When a resolution request is received and there are no current IP address, the HNR requests the VNR to wake up the device, i.e. ask the device to authenticate, get an IP address and report it, as illustrated for example in FIG. 21.

APPENDIX 1

Security Considerations

Mobile NAT does not intend to be more secure than the underlying networks.
  IP VPN or transport security mechanisms such as HTTPS can be used transparently between two end points.

APPENDIX 2

References

RFC 791, Internet Protocol
  RFC 792, Internet Control Message Protocol
  RFC 903, A Reverse Address Resolution Protocol
  RFC 1349, Type of Service in the Internet Protocol Suite
  RFC 1631, The IP Network Address Translator (NAT)
  RFC 2002, IP Mobility Support
  RFC 2332, NBMA Next Hop Resolution Protocol (NHRP)
  RFC 2344, Reverse Tunneling for Mobile IP
  RFC 2520, NHRP with Mobile NHCs
  RFC 2663, IP Network Address Translator (NAT) Terminology and Considerations.
  In another exemplary embodiment of the invention **(4):

The mobile phone became an integral part of everyday life of more than a billion of people. It is now so "close" to its user than it is a fashion accessory for some and a social level display for others.

This is good news and bad news. Good news because the market is dynamic, bad news because the market is volatile and essentially unpredictable. Analysts, industry players and the specialized press realize that what they supposed to be an essential driver like access to email, may not be as critical as initially thought (IDC 2003). Other analysts admit that "there are no killer app on the horizon . . . there is a killer architecture".

So if the only certainty is that the demand is not predictable, a secure option is to prepare to be agile and adapt to the changes as fast and as cheap as possible:

Initiatives focusing on definition of "user profile" have flourished in standards bodies and in the industry. Those efforts intend to rationalize information internally to reduce operational costs, ease introduction of services and ease publication of a subset of such collected information to third parties.

Most of operators tend to introduce some form of Enterprise Application Integration (EAI) to regain control of all data scattered in numerous data sources to realize the full potential of such user profile. Again, this targets cost reduction in creating new services and allowing data mining and business intelligence to be more effective or just possible.

But, is it a sufficient or a pre-requisite for best business agility and performance?

From a high level stand point the attitude can be summarized as "let's redefine what we need, standardize it and define a plan to implement it in existing infrastructure".

While there was consensus that the current set of mobile network standards left "room for expansion", experience shows that things are difficult to change. Yes there is room for expansion from a standard specification perspective, but not on the implementation side.

So at the speed of current market evolution, the findings of the standard bodies in terms of what is relevant to store or handle for each subscriber may just be valid for a few years.

Lessons learnt in IT should benefit the telecommunications world and allow the telecommunications industry to skip over an intermediary step and use directly the latest concepts being used in IT: rather than just defining the list of "things" that should be "stored" for each mobile network end-customer, the process of adding new things to existing knowledge base should be clear.

In other words, implementing EAI is a tactical project that supports cost reduction and better use of current knowledge; it is not a strategic plan for business agility.

Hence, what are the key enablers for business agility?

A dynamic and flexible customer knowledge base; where associating new "preferences" or information with customers is a well defined process A dynamic and flexible event infrastructure; where events generated by many sources such as OSS, BSS and even external events can be leveraged to unleash opportunities and be proactive in managing the mobile business.

Dynamic and Flexible Customer Knowledge Base

Customer knowledge base complements an EAI:

An EAI is used to simplify provisioning, ensure data consistency among sources which is a pre-requisite for quality data mining. There is an implicit assumption that every customer is described by the same set of information. In other words, each customer is described by the same common set of attributes.

A customer knowledge base is used to adapt to changing requirements in terms of information stored per customer. For instance, it is expected that teenagers will drive game business in a highly dynamic way. So teenagers' attributes may evolve more frequently than the ones for corporate users and are of different nature. As a matter of fact, attributes needed for speed dating (age, eyes/hair color, smoking status, marital status . . . ) are very different from the ones for hotel preferences.

This does not mean that the operator IS the operational database for delivering speed dating service. It just means that the operator CAN leverage this knowledge when/if this makes sense.

From a lifecycle perspective, an attribute can start its "life" within the bounds of the knowledge base as an "informative" attribute and gradually migrate to EAI and supporting database as an "active" attribute. For instance, "smoking status" could be gradually provisioned by people. When reaching a certain level of commonness between customers, it may be worthwhile to inject this attribute into the EAI and data mining tools.

The knowledge base is a key business enabler between the mobile operator and third party service providers. Access should be controlled by the customer and protect his/her privacy without incurring provisioning headaches for the mobile operator, the customer or the third party. It also "shields" the mobile internal systems from the open world and also helps capacity planning for both internal and external systems.

Dynamic and Flexible Event Infrastructure

Mobile networks are by essence the most dynamic computing constructs ever built and are used continuously by over a billion of people. The Internet may generate more traffic in terms of volume but its usage pattern is far less dynamic and interactive than mobile networks (for instance on most European markets, people are connecting four times a week on average, totalizing two hours connection time).

Surprisingly, mobile networks do not proactively assist its end-users or its owners:

While it is certainly the most effective and widely use means of communication, mobile networks do not offer personalized communications When a user fails configuring its GPRS handset or accessing an Internet resource, the network detects the issue but the customer support department is not informed and cannot take measures to avoid frustration.

Fraud detection solutions are essentially done offline mainly because event collection from multiple applications could jeopardize network behavior and the lack of a generic event "sharing" framework.

In the mean time, little attention has been dedicated on providing a foundation to leverage the events generated by the network to enhance user experience, tighten control over the infrastructure and introduce pro-active services. Luckily, a standard event protocol has been defined in addition of being used in 3GPP: SIP. Event packages for 3GPP IP Multimedia Subsystem as well as instant messaging and presence have been already defined. Further packages can be easily defined and implemented to cover all the needs of telecommunications operators.

Generic event generation, publication and forwarding ensure secure and cost efficient distribution of events to many applications as well as seamless aggregation and correlation:

While technically feasible, distribution of events from the SS7 network should not be done directly to shield the network from external mis-behavior. Hence, while most network elements or probes generate real-time events, they should be handled only by internal trusted systems and then forwarded to less trusted elements.

For instance, rather than services directly integrate with SS7 network probes, network related events (attach/detach/call in progress . . . ) should be distributed by the generic event layer to applications such as fraud management, instant messaging server, presence server . . . .

As it is not acceptable to let each service poll shared resources, event generation allows one component to poll the shared resource and generate and distribute the resulting events to all services that need to consume it.

Publication of events assume controlled distribution according to security and privacy policies both internally (in the operator network) and externally (to trusted third parties). Publication is also about protocol interfaces and software APIs to facilitate consumption of events.

Handling events provides the most effective use of resources to offer pro-active services and real-time reaction to operational context changes. However, not all applications are built to cope with events. It is thus much needed to describe not only the expected event but also describe the expected behavior when the event triggers.

Exemplary Proposal:

LinkUsAll LLC leveraged core technology developed over three years from Versada Networks to build a large scale event infrastructure and dynamic customer knowledge base. It has been successfully applied to Presence and WiFi infrastructure and could be applied more generally to mobile network.

Speed of execution and cost of implementation are key success factors in today's market conditions.

So rather than the lengthy and expensive opportunity assessment process (theoretical study+"technical feasibility" study+"market assessment" analysis) Link Us All proposes Orange to provide the technology for free along with a consulting agreement to provide all decision making elements regarding customer knowledge base and generic event handling.

Building on Link Us All experience and software, Orange will quickly identify what can be deployed in a cost efficient way.

Deliverables

The key deliverables are:

Knowledge base and Event engine software license

Ranked list of possible application domains (customer experience, network operations cost reduction, fraud control . . . ) and sample services (GPRS configuration wizard . . . ).

List of events that can be retrieved from the mobile network (both voice and data)

Architecture options to implement knowledge base and event infrastructure

Third party protocol and software interfaces requirements, in particular privacy policy provisioning and enforcement Proof of Concept The proposed deliverables will be produced based on the results of a proof of concept platform. The goal of such proof of concept is to illustrate significantly different use cases and foster creativity. As a result, the list of use cases is flexible and will be determined by Orange.

As a starting point, it is envisioned that four use cases may be implemented:

Personal Information Management
Acknowledgment of SMS reading
Real-time fraud detection
GPRS configuration issue detection The minimal implementation includes the Personal Information Management and SMS reading generic notifications.

The implementation may require collaboration with diverse parties such as SS7 probes, SMS center. Link Us All will produce software to integrate its event platform to those external sources using the means made available by Orange. In other words, Orange will acquire any "external" software license or hardware needed for the integration.

Personal Information Management

Personal Information Management use case objective is to illustrate the concept of dynamic and flexible knowledge base.

Here personal information includes for example (but is not limited to):

Phone number of personal doctor;
Phone number of parents (for children);
Phone number of person to contact in case of emergency;
Critical allergies;
Blood group; and
Organ donor status.

Use of this information may be used to assist customers in case of emergencies or need (children lost in a mall).

Usage of this information may be envisioned through multiple scenarios:

Dial 9999 on customer's phone to reach the personal doctor

Dial 9998 on customer's phone to reach the parents (for children)

Dial 9997 on customer's phone to reach the person to contact

Dial a toll free number from any phone, enter a person number of SIM card number or phone number to obtain the personal information (voice activated, DTMF . . . )

SMS based access through mobile phones

Web Access

Scenarios should illustrate privacy enforcement based on customers' choices. Controlling privacy is a key acceptance factor of the service and provisioning of the privacy policies are one of the most challenging aspects of implementing privacy management. If privacy policies require a lot of provisioning activities or are complex to state, people would probably do not provision them, resulting in a lack of privacy if the service is used.

One of the ways that can be used to facilitate implementation of privacy policies is to implement diverse trust delegation schemes. In such scenarios, one entity is either explicitly or implicitly provisioned as a trusted party that can access a subset of private information and may be further entitled to authorize depending personnel to access such private information.

Example of implicit provisioning: mobile operator may implicitly authorize a governmental healthcare agency to consult a subset of private information (allergies, blood group . . . ). This agency can in turn validate other health-care groups to access the same set of information. Lastly, providing that specific personnel are authenticated by one of the health care entities, these personnel are allowed to access the designated private information.

Example of explicit provisioning: To allow a friend or a group of friends to access any private information, a person may have to provision a specific privacy policy.

Implementation of the provisioning of such policies can take many forms. In particular, it is envisioned that Liberty-Alliance related technologies may be of great help ensuring minimal explicit provisioning requirements.

The list of stored attributes is defined by Orange. This list can be changed in real-time independently for any subscriber (not all subscribers have the same set of attributes), without any influence on the service.

For the sake of the experimentation, it is envisioned that the simplest and cheapest way of demonstrating the concepts is to use SMS as the interface: a person can obtain information about another one in the form of a SMS by sending the E.164, IMSI or IMEI number to a dedicated SMS number.

Additional information on this scenario can be found in "technical specifications" and "test cases" documents.

Acknowledgement of SMS Reading

Orange R&I is currently working on a solution to offer extended SMS service based on acknowledgment of reading rather than just acknowledgment of reception.

This service is based on an application residing on a server in the mobile operator infrastructure.

Notification component of the service can be extended through the use of generic event notification capabilities: the notification can be routed to any target device and messaging systems based on the context of the customer.

These routing capability and associated routing rules can be shared among applications and not tight to just SMS acknowledgments.

Additional information on this scenario can be found in "technical specifications" and "test cases" documents.

Real-Time Fraud Detection

Fraud detection is a vast topic and is restricted for the purpose of the project to SIM clones detection.

This type of detection is currently done off-line on a regular basis but is not done in real-time. This exposes Orange to revenue leakage.

One solution to this problem is to dedicate systems to this issue and use real-time data mining tools from the market to handle the Terabytes of generated CDR.

Another solution is to use real-time event collection (such as network attach) to trigger fraud detection. The amount of data to handle is in the range of 100 times lower than working on the CDRS and as it is event triggered, detection is truly done in real-time (at the precise moment of the fraud attempt) rather than every 15 minutes (thus wasting resources).

Orange has already deployed SS7 probes in its network. The experimentation can leverage public interfaces to those equipments and translate SS7 events into generic events.

Such low level events can then be fed into the generic event infrastructure. In turn the event infrastructure triggers multiple associated evaluation and/or matching rules to generate high level events.

Orange is able to change and extend in real-time the evaluation and matching rules triggered by low level events. In this context "change" means modify the behavior or define completely new rules.

Additional information on this scenario can be found in "technical specifications" and "test cases" documents.

GPRS Configuration Issue Detection

Platforms in the GPRS network can be configured to detect configuration channels and issue SNMP traps.

Such event can be "translated" to a generic event and distributed in a variety of applications.

For the experimentation, such an SNMP event will send a trouble ticket to customer support representative for immediate action: call the customer in trouble and help her or him.

Additional information on this scenario can be found in "technical specifications" and "test cases" documents.

Proof of Concept Architecture Highlights

Figure 22:
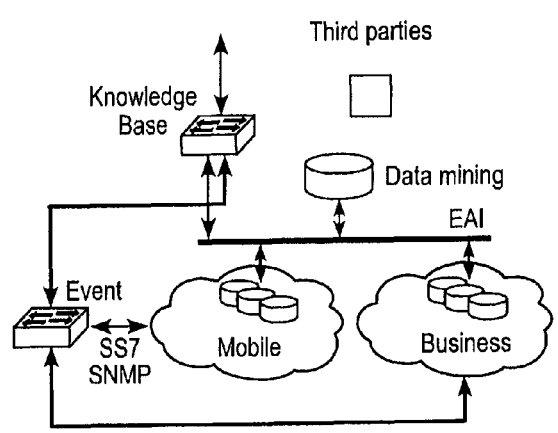
FIG. 22 illustrates an exemplary communication system architecture or structure.

FIG. 22 illustrates an exemplary overall architecture, which can for example serve as a starting point to the analysis for the delivery of study regarding architecture options.

SIP defined a standard framework for subscribing and publishing events. From a design perspective such a framework is restricted to events which frequency is in range of the second. It is not designed to handle events that occur in a nuclear reactor with occurrence frequency of million times per second. It should be clear that this does not prevent the system to handle massive amounts of events. Looking at it more closely, network events for one single subscriber do not occur thousand times per second!

In other words, an SIP event framework can handle millions of events per second, providing that such events are attached to millions of different people so that event handling time is consistent with event occurrence frequency.

Figure 23:
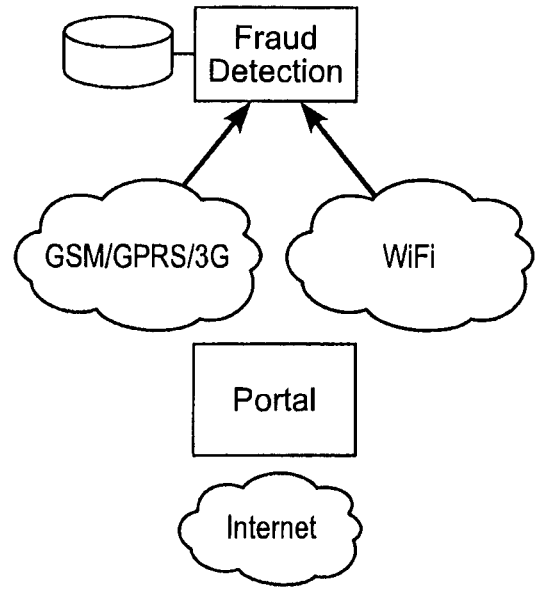
FIG. 23 illustrates an exemplary fraud detection system.
Figure 24:
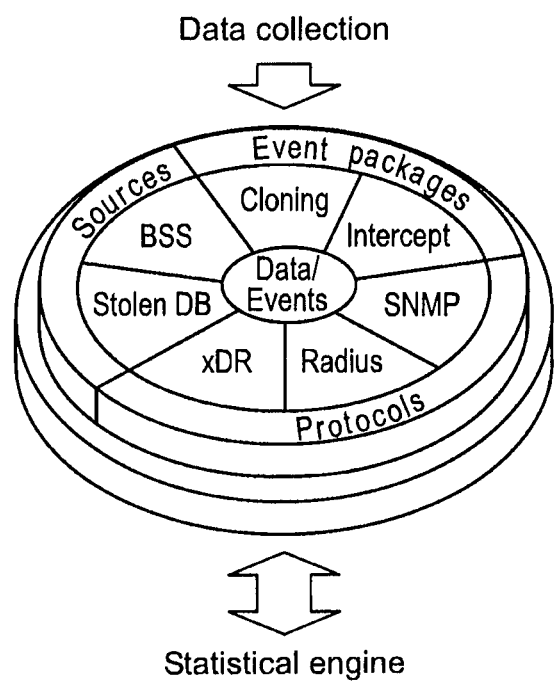
FIG. 24 illustrates exemplary operation of the fraud detection system.
Figure 25:
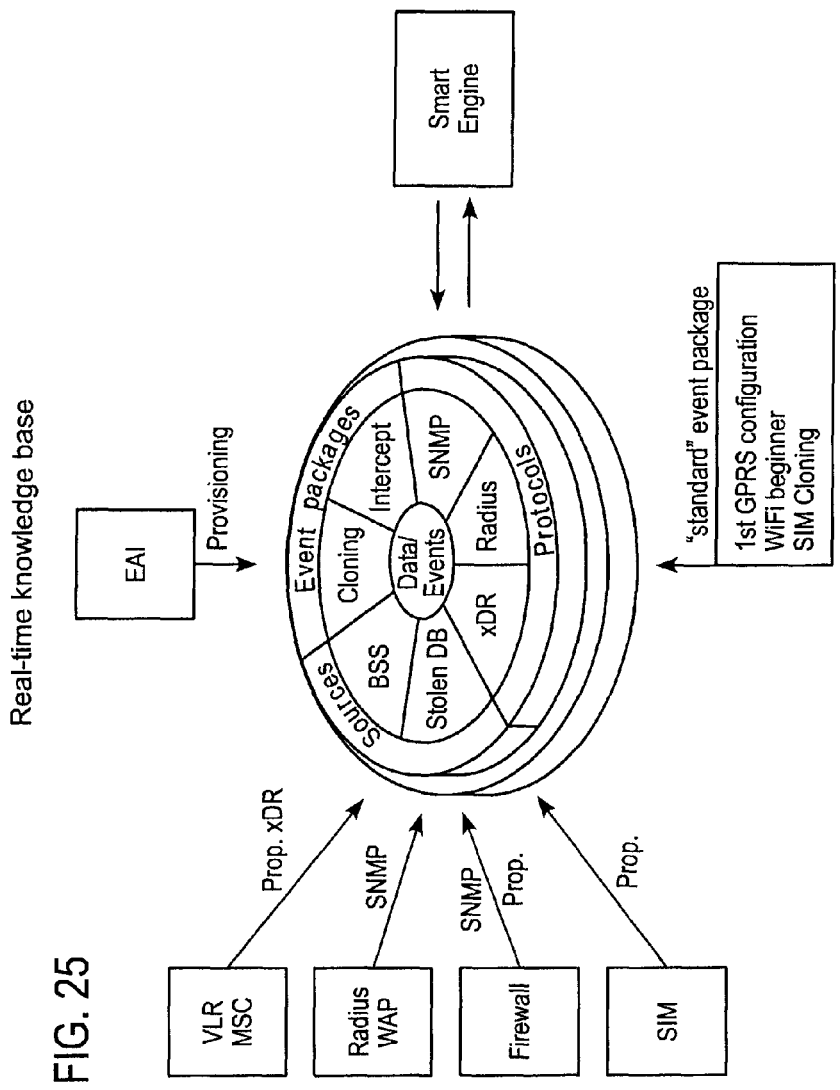
FIG. 25 illustrates an exemplary structure of the fraud detection system.
Figure 27:
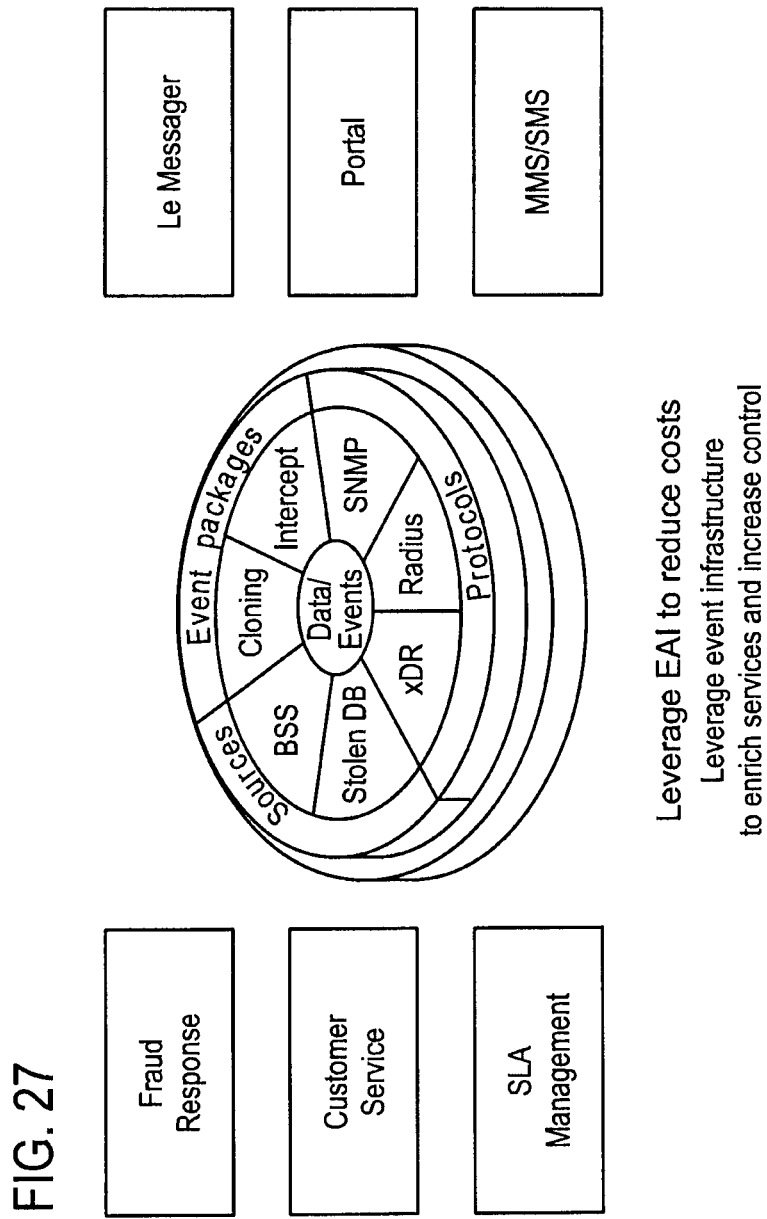
FIG. 27 illustrates an exemplary use structure of the fraud detection system.

In an exemplary embodiment (5), fraud detection is included as component of Active Mobility. In an exemplary embodiment as shown for example in FIG. 23, this detection functions across multiple networks and multiple applications, e.g. GPRS, WiFi, 3G, and so forth, and detects misbehavior, unauthorized usage, evasion (handset subsidies), and so forth. Exemplary systems that can be employed include: expert systems, which can work well with bounded problems but which may not provide exhaustive detection; neural networks (with and without feedback), which employ derivatives recognition (e.g. face, writing, robot . . . ) and have a learning curve, since they operate by recognition rather than by deduction; and statistical models/fuzzy sets, that can detect unknowns (e.g. computer viruses, nuclear power plant anomalous behavior, etc.) but require mathematics to adapt the model. In an exemplary embodiment, detection is provided in real time (or within specified response time), so that risk values are kept to within acceptable levels. In an exemplary embodiment, a two-stage analyzer is provided to detect fraud or undesired behavior or usage. The first stage can include, for example, an expert system, that can for example detect situations where further assistance is needed, either technical resources and/or direction of a human operator. The expert system can also detect well-known attacks or types of attacks. The second stage can include, for example, "smart" analysis to detect heretofore unknown attacks, and can be implemented for example via a statistical model(s) and/or fuzzy set(s). FIG. 24 illustrates exemplary operation of the two-stage analyzer. FIG. 25 illustrates an exemplary real-time knowledge base included in the detection system. FIG. 26 illustrates exemplary information gathered or generated by the detection system. The detection system can be used to both enhance customer support and reduce fraud response times. Event infrastructure can be leveraged to enrich services and increase control, as shown for example in FIG. 27. With respect to scale, applicants note that an exemplary VLR interface can have several hundred events per VLR, with 300 byte messages, corresponding to roughly 4,000 events per second at data transfer rates on the order of 10 Mbps. An MSC interface can have several thousand events per MSC, with 300 byte messages and can provide location capture, corresponding roughly to 200,000 events per second at data transfer rates on the order of 480 Mbps.

In another exemplary embodiment (**5), wireless communication roaming problems are addressed.

Enterprise solutions can have limited deployment, verticals but can integrated in business strategy—(e.g., island), can include cryptography solutions, can make VPN hardware obsolete, have some deployment costs and do not address business partners.

With WISP there can be a hotspot deployment focus, business models will be established, there were 15,000 subscribers in the USA as of December 2002, 12 out of 26 providers do NOT have roaming agreements, voice services cannot be deployed today. Enterprise solutions/technology can be used. Access Control, Accounting can be provided by: Radius. Session persistence: Mobile VPN.

Enterprise, beyond email: Intranet access
 Goal: cheapest total cost of ownership
 Designed as an add-on to existing technology
 VPN hardware to provide session persistence (inc. With Cellular Data)
 Microsoft "Greenwich" and ActiveDirectory
 Single Sign-On and B2B portals
WISP, beyond flat rate: profitable WiFi
 Trustable/scalable In-Band Accounting
 "Mall" and Metropolitan Mobile WiFi
 Bring Cellular revenue models to WiFi
 Cellular roaming brought to WiFi
 SMS/MMS type transaction based revenues
 Usage based fees (high end conferencing . . . )

Figure 28:
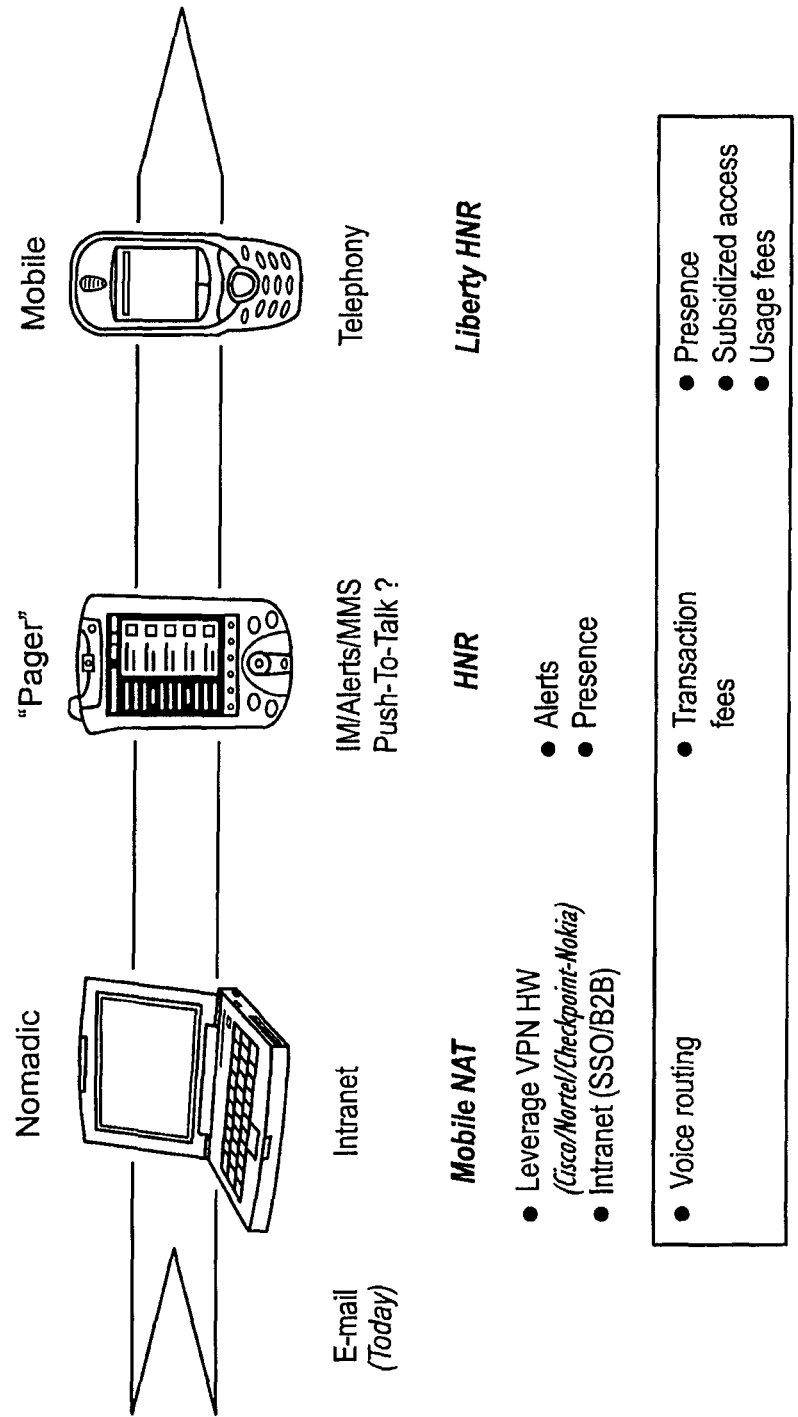
FIG. 28 illustrates exemplary phases of a communication system.

Mobile intranet access can be provided as shown for example in FIG. 28 illustrates three different phases.

Figure 29:
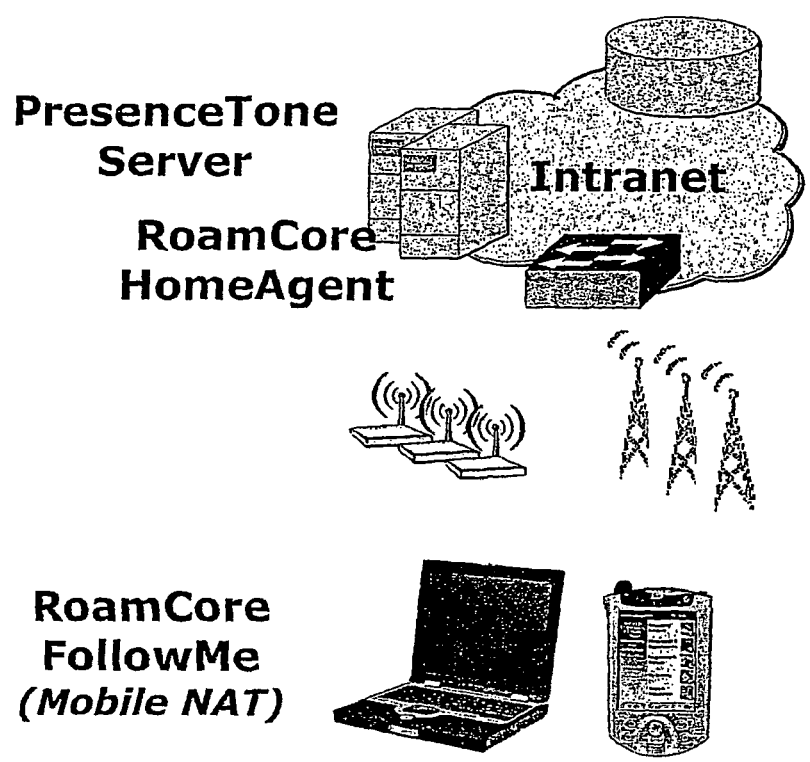
FIG. 29 illustrates an exemplary mobile intranet access system.

FIG. 29 illustrates a solution in situations where VPN HW may not be re-used, peer-to-peer communication is costly, and voice support is available in large networks. In particular, existing technology is leveraged. VPN hardware co-exists with "end-to-end" Cisco solution, Windows Server 2003 Internet Access Server and Microsoft "Greenwich project" are complemented, and Liberty-Alliance compliant SSO is provided (e.g. Employees, Business Partners, Customers).

Figure 30:
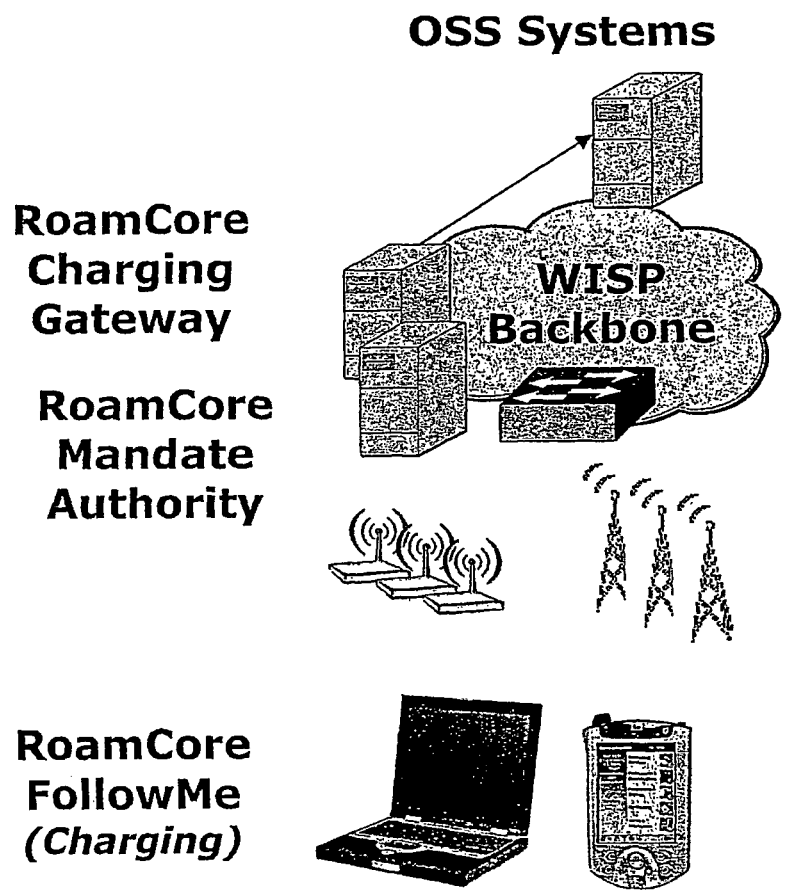
FIG. 30 illustrates an exemplary scalable mobile communication system having trustable/scalable accounting.

FIG. 30 illustrates a solution in situations where with respect to fraud, mobile communications networks have the same weaknesses as voice networks did in the 70's. Also, IETF acknowledges RADIUS scalability issues and developed DIAMETER. The solution: in-band accounting, seamless subsidized access, and RADIUS Accounting gateway (leverage investments, avoids scalability issues).

Figure 31:
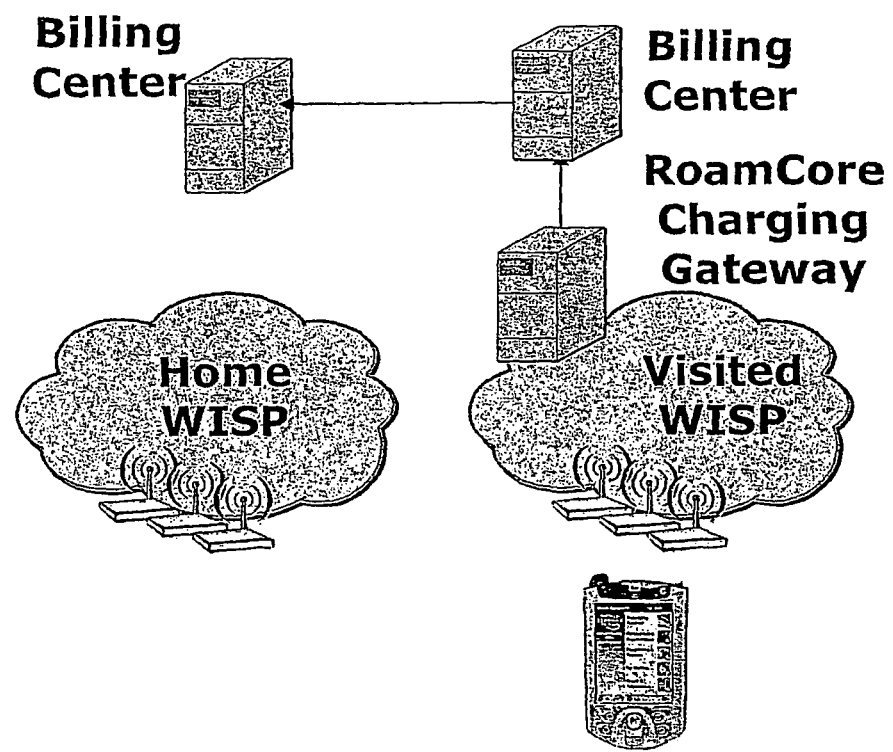
FIG. 31 illustrates exemplary roaming in a mobile communication system.

FIG. 31 illustrates a solution in situations where 12 out of 26 WISP are without roaming, and IETF RADIUS scalability issues prevents TRANSPARENT persistence (voice, streaming), and GPRS roaming is still the exception. The solution: bring cellular concepts to WiFi, integrate with GPRS roaming, Accounting, Settlement, coexists with non-HNR enabled WISPs (but with RADIUS limited settlement).

Figure 32:
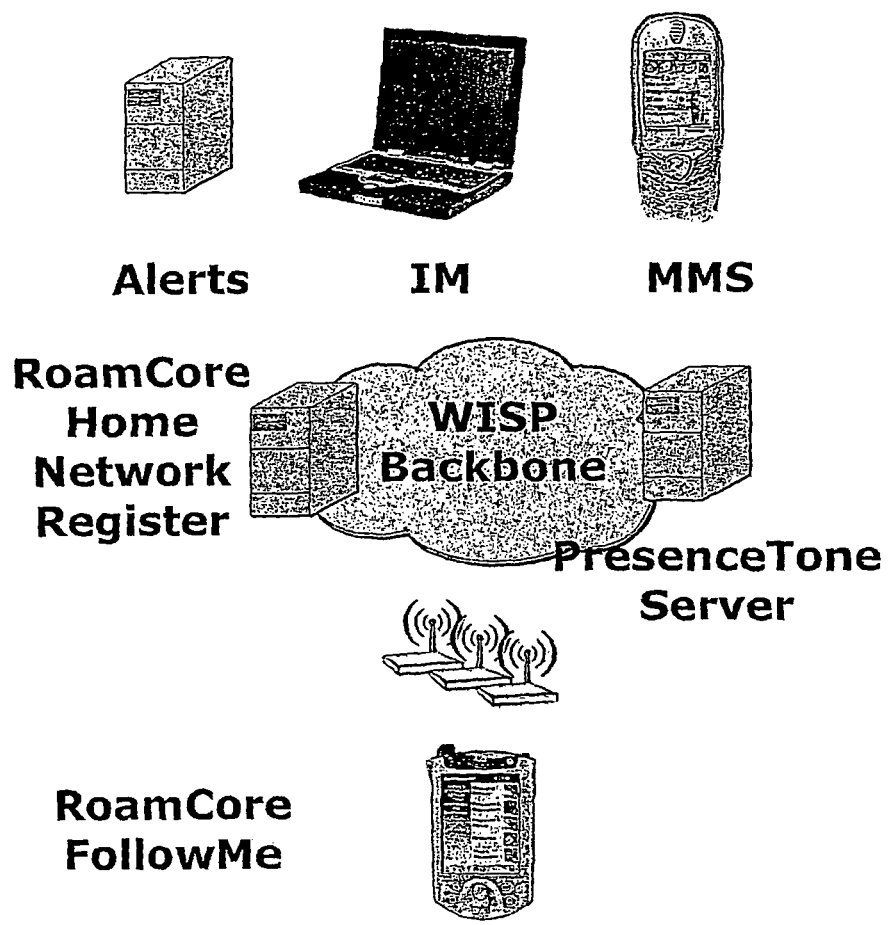
FIG. 32 illustrates exemplary alerting in a mobile communication system.

FIG. 32 illustrates a solution in situations where standby devices are available or devices may be in standby mode, and IP address availability and battery lifetime are constraints. The solution: leverage existing IM or Alerts solutions, and bridge MMS cellular phones and PDAs over WiFi (+PresenceTone).

Figure 33:
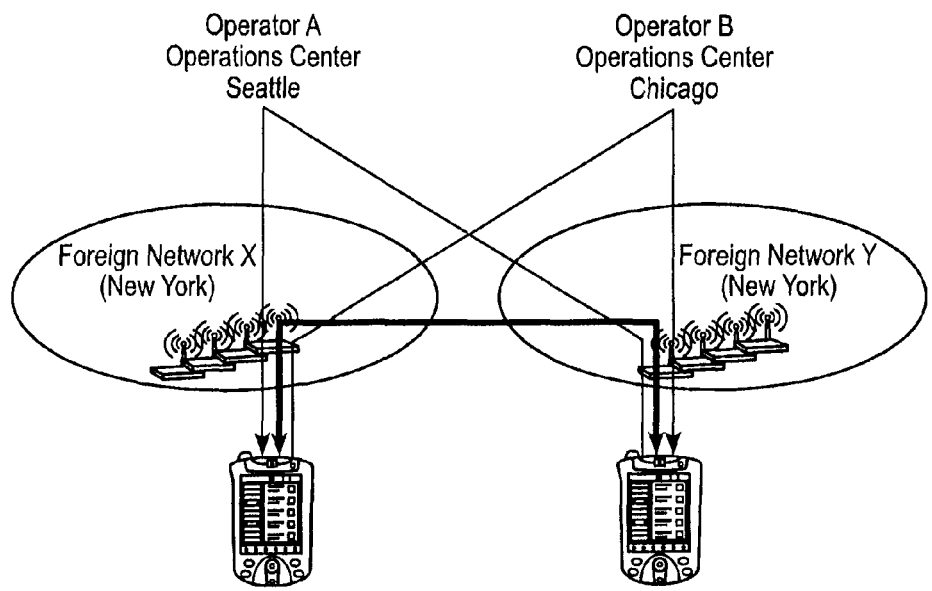
FIGS. 33-34 illustrates exemplary interactive media in a mobile communication system.
Figure 34:
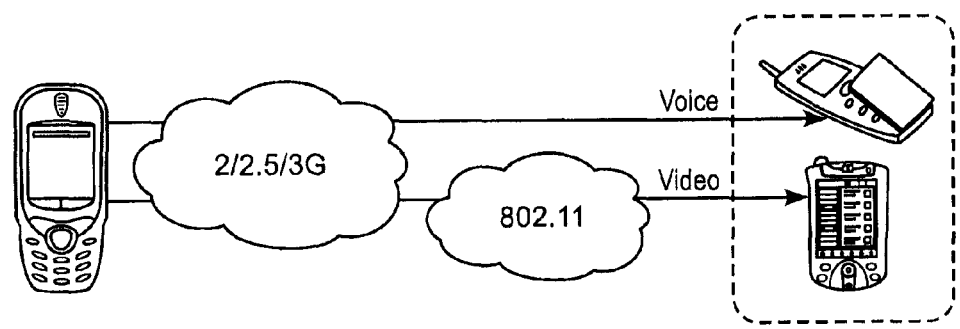

FIGS. 33-34 illustrate a solution in situations where reachability issues are a constraint (e.g. standby, IP address availability, device battery life) and tandem routing is an issue. The solution: no new technology deployed, just leverage critical mass of hotspots and WiFi PDA/Smartphones; Mobile NAT avoids tandem routing; charging gateways count the minutes/time used; and PresenceTone enables Multimodal applications.

Accounting (RADIUS) reality check: Concrete implementations do not allow full contract information (rating . . . ) exchange. Lack of SETTLEMENT support. Fraud is a high risk: usage is measured "in-band" hence suffering the same weaknesses as voice networks in the 70s. Does not support subsidizing access. RFC3127: "Although accounting continues to be weaker than other approaches, the protocol remains a strong contender for continued use in the areas of Authorization and Authentication". RFC3141 (CDMA2000): "To achieve a faster handoff, the mobile may attempt to avoid an AAA transaction with the home AAA server."

To address reachability problems, expand SMS/MMS. With respect to IP connectivity, in WiFi (and 2.5G), the only way to receive a message (or a "call") is to maintain IP connectivity. This solution has "costs" impacts that restricts its applicability. For example, Battery power waste and Infrastructure costs to support hand-off/roaming maintenance (battery life is business life). In addition, Address space waste (mobile/care-of addresses) that will become a major hurdle as IP address scheme does not have enough room for all mobile devices. 3GPP developed a solution that will be implemented in the context of a 3G network (or enhanced 2.5G). However, using IP v6 will not solve the waste of battery power. Furthermore, no network operator (fixed internet, 2.5G) seems to be keen to deploy such technology despite the efforts from vendors. With respect to StandBy devices, special care must be taken for Laptops/PDAs in standby mode to receive MMS message (or "calls").

Figure 35:
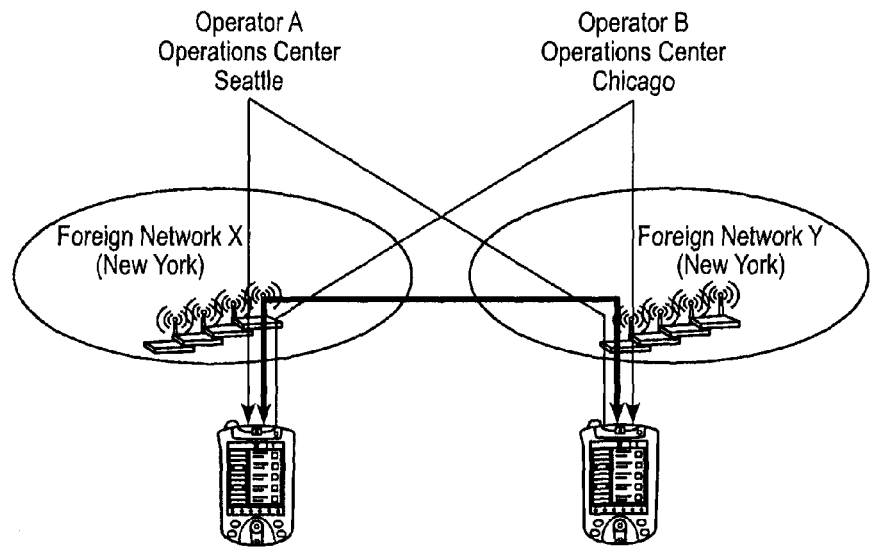
FIGS. 35-37 illustrate exemplary communication procedures in a mobile communication system.

Interactive Voice Value Propositions: 1. High end conferencing, including better speaker identification (especially women), better support of "collisions", less background noise annoyance, and "MyConferencing" anywhere, anytime, for all devices; 2. Push-To-Talk, where field experiments in 2.5G networks have shown that without specific network upgrades service is not usable due to high latency (up to 7 seconds), has high acceptance by enterprise users, and subsidized model appears to be the best business case; 3. High end telephony for verticals, e.g. Journalists—replacement of MP3 over ISDN, music production. The solution: Network Latency. As shown for example in FIG. 35, rather than using tunneling as the way to handle mobility, RoamCore FollowMe introduces Mobile NAT. Tunneling is not adequate to carry connection less delay sensitive data as it defeats multimedia IP mechanisms. Tunneling doubles header size hence potentially doubling the number of MULTIMEDIA packets to be sent. Net result is potentially twice less active users per access point. Also, tunneling has a fixed point in the home network that jeopardize voice-over-IP traffic. In the solution, a Home Agent is used to enable servers to deal with Mobile NAT-enabled devices without installing Mobile NAT on those servers.

Figure 36:
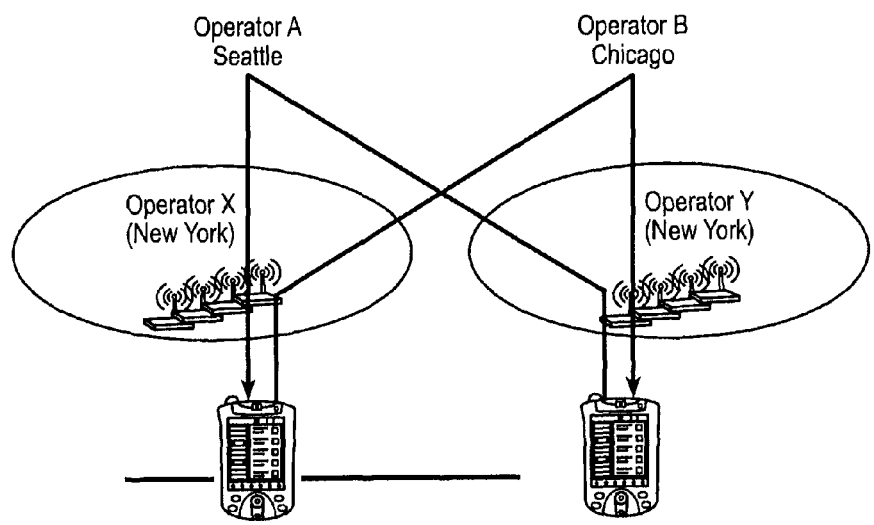
Figure 37:
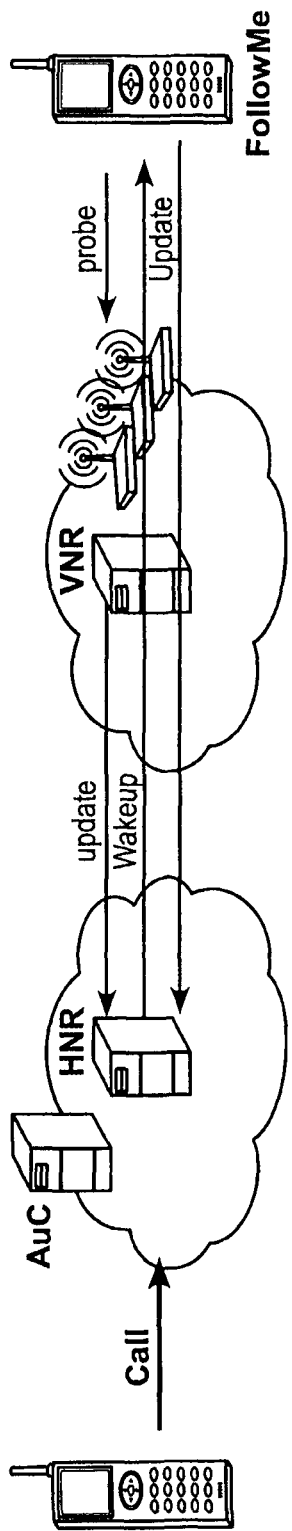

Reachablity/Latency: Voice. As shown in FIG. 36, the same SMS/MMS reachability issue needs to be solved with respect to voice. For example, current voice network designs ensures less than 300 ms delay even for trans-Atlantic links. In addition, although Voice-Over-IP is now well mastered, device mobility will introduce complex new issues that need to be addressed. Current mobility solutions do not address today's requirement in public networks because of a problem called tandem-routing in voice networks. Even costly overcapacity solutions would not solve these issues. FIG. 37 illustrates a solution, where RoamCore HNR/AuC/VNR/FollowMe collaborate to provide a Dynamic Mobile DNS, and translate mobility and scalability concepts from cellular networks into a streamlined version for Mobile IP networks. In one scenario, receive alerts (e.g., "you've got mail . . . ), IMs, MMS, and so forth. In another scenario, while the mobile communication device is in standby mode, mall proximity is reached, pushed ad(s) are received, and offers for "free" access in exchange for feed-back to the pushed advertisements are proffered or provided to the mobile communication device for the device's owner to act on. Standard DNS cannot be used because it does not know how to "wake-up" a device (no IP address or in stand-by mode). In addition, Dynamic DNS cannot handle millions of mobile devices updates many times an hour . . . (compared to a few ADSL updates per month).

Authentication: Number of subscribers. Subscribers can have very different usage patterns and demographics. Today there are at least 5 times more phones than personal computers (PCs). PC Internet connection is used a few hours a week in average while phones are ALLWAYS ON and REACHABLE. In mobility scenarios, current authentication scheme would drain the cell phone battery. Lessons learned from large mobile and ISP networks include: actual GPRS authentication times vary from 1 to 20 seconds ( . . . for just a few hundred thousand subscribers); adding hardware is not enough, e.g. MSN faced high churn due to their inability to handle the load of very active users, and to re-engineer their authentication method. IETF Authentication Authorization Accounting group quotes on RADIUS: RFC2865: "Experience has shown that it can suffer degraded performance and lost data when used in large scale systems, in part because it does not include provisions for congestion control . . . / . . . IETF's AAA working group, which may develop a successor protocol that better addresses the scaling and congestion control issues."

Software packages, elements or modules for variously providing the functions described herein, can be implemented on a computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein. The term "comprising" as used herein is open-ended and not exclusive.

The invention claimed is:

1. A method for maintaining device application connectivity, comprising:
    assigning an auxiliary address in a first device, the auxiliary address being representative of a second device, the first device having a first device address, and the second device having a second device address different than the first device address; and
    accessing, by at least one application of the first device, the second device by
        converting data having the auxiliary address as a destination address and to be transmitted to the second device to have the second device address as the destination address;
        converting data having the second device address as an origin address and received from the second device to have the auxiliary address as the origin address;
    assigning a second device auxiliary address in a second device, the second device auxiliary address being representative of the first device; and
    accessing, by at least one application of the second device, the first device by
        converting data having the second device auxiliary address as a destination address and to be transmitted to the first device to have the first device address as the destination address; and
        converting data having the first device address as an origin address and received from the first device to have the second device auxiliary address as the origin address.

2. A method for maintaining device application connectivity, comprising:
    assigning an auxiliary address in a first device, the auxiliary address being representative of a second device, the first device having a first device address, and the second device having a second device address different than the first device address;
    accessing, by at least one application of the first device, the second device by
    converting data having the auxiliary address as a destination address and to be transmitted to the second device to have the second device address as the destination address;
    converting data having the second device address as an origin address and received from the second device to have the auxiliary address as the origin address;
    sending and receiving data, by the first device, using the first device address to represent the first device;
    requesting and receiving, by the first device, another address that represents the first device;
    sending and receiving data, by the first device, using the another address to represent the first device;
    informing at least one of the second device and other computers of the another address so that the at least one of the second device and other computers can use the another address to represent the first device;
    receiving, by the first device, a first identifier of a first redirect server system of a network registrar;
    sending, by the first device, a message to the first redirect server system using the first identifier;
    receiving, by the first device, first redirection information from the first redirect server system, the first redirection information including a second identifier of a second redirect server system of the network registrar;
    sending, by the first device, the message to the second redirect server system using the second identifier;
    receiving, by the first device, second redirection information from the second redirect server system, the second redirection information including a third identifier of an agent of the network registrar; and
    sending, by the first device, the message to an agent of the network registrar using the third identifier.

3. The method of claim 2, wherein the message is a SIP message.

4. The method of claim 2, wherein the first device is a mobile device.

5. The method claim 2, wherein the step of sending the message to the agent comprises sending the message directly to the agent.

6. The method claim 2, wherein the step of sending the message to the agent comprises sending the message using an address of the form <user>@<agent>.<network> where <user> is a name associated with the computer, <agent> is a name associated with the agent, and <network> is a name associated with a network of the home network registrar.

7. The method of claim 2, comprising sending, by the first device, subsequent messages to the agent.

8. A first device configured to maintain application connectivity, comprising:
   a memory configured to store an address of the first device, an address of a second device, and at least one application; and
   a processor configured to:
   assign an auxiliary address, the auxiliary address being representative of the second device, the second device address being different from the first device address; and
   access, by the at least one application of the first device, the second device by:
   converting data having the auxiliary address as a destination address and to be transmitted to the second device to have the second device address as the destination address; and
   converting data having the second device address as an origin address and received from the second device to have the auxiliary address as the origin address;
   wherein the processor is configured to:
   send and receive data using the first device address to represent the first device;
   request and receive another address that represents the first device;
   send and receive data using the another address to represent the first device;
   inform at least one of the second device and other computers of the another address so that the at least one of the second device and other computers can use the another address to represent the first device;
   receive a first identifier of a first redirect server system of a network registrar;
   send a message to the first redirect server system using the first identifier;
   receive first redirection information from the first redirect server system, the first redirection information including a second identifier of a second redirect server system of the network registrar;
   send the message to the second redirect server system using the second identifier;
   receive second redirection information from the second redirect server system, the second redirection information including a third identifier of an agent of the network registrar; and
   send the message to an agent of the network registrar using the third identifier.

9. The first device of claim 8, wherein the message is a SIP message.

10. The first device of claim 8, wherein the processor is configured to send the message using an address of the form <user>@<agent>.<network>, where <user> is a name associated with the computer, <agent> is a name associated with the agent, and <network> is a name associated with a network of the home network registrar.

11. A non-transitory computer readable recording medium having stored thereon instructions, which, when executed by a processor of a first device, execute a process for maintaining application connectivity of the first device, the process comprising:
   assigning an auxiliary address in the first device, the auxiliary address being representative of a second device, the first device having a first device address, and the second device having a second device address different than the first device address; and
   accessing, by at least one application of the first device, the second device by
   converting data having the auxiliary address as a destination address and to be transmitted to the second device to have the second device address as the destination address; and
   converting data having the second device address as an origin address and received from the second device to have the auxiliary address as the origin address,
   sending and receiving data using the first device address to represent the first device;
   requesting and receiving another address that represents the first device;
   sending and receiving data using the another address to represent the first device;
   informing at least one of the second device and other computers of the another address so that the at least one of the second device and other computers can use the another address to represent the first device;
   receiving a first identifier of a first redirect server system of a network registrar;
   sending a message to the first redirect server system using the first identifier;
   receiving first redirection information from the first redirect server system, the first redirection information including a second identifier of a second redirect server system of the network registrar;
   sending the message to the second redirect server system using the second identifier;
   receiving second redirection information from the second redirect server system, the second redirection information including a third identifier of an agent of the network registrar; and
   sending the message to an agent of the network registrar using the third identifier.

12. The non-transitory computer readable recording medium of claim 11, wherein the message is a SIP message.

13. The non-transitory computer readable recording medium of claim 11, wherein the message is sent using an address of the form <user>@<agent>.<network>, where <user> is a name associated with the computer, <agent> is a name associated with the agent, and <network> is a name associated with a network of the home network registrar.

14. The method of claim 1, comprising:
   receiving, by the first device, a new second device address of the second device; and
   accessing, by at least one application of the first device, the second device by
   converting data having the auxiliary address as a destination address and to be transmitted to the second device to have the new second device address as the destination address; and
   converting data having the new second device address as an origin address and received from the second device to have the auxiliary address as the origin address.

15. The method of claim 14, wherein the mobile device communicates the data using at least one of a wireless LAN technology and a cellular network technology.

16. The method of claim 1, wherein the first device is a mobile device.

17. The method of claim 1, comprising:
sending and receiving data, by the first device, using the first device address to represent the first device;
requesting and receiving, by the first device, another address that represents the first device; and
sending and receiving data, by the first device, using the another address to represent the first device.

18. The method of claim 17, comprising:
informing at least one of the second device and other computers of the another address so that the at least one of the second device and other computers can use the another address to represent the first device.

19. The method of claim 17, wherein the receiving data, by the first device, using the first device address to represent the first device is contemporaneous with the receiving data, by the first device, using the another address to represent the first device.

20. The method of claim 17, wherein the first device address is an address of a first network access point and the another address is an address of a second network access point different from the first device address.

21. The method of claim 17, wherein the first device address is an address of a first network and the another address is an address of a second network different from the first device address.

22. The method of claim 21, wherein one of the first network and the second network is wireless LAN and the other of the first network and the second network is a cellular network.

23. A first device configured to maintain application connectivity, comprising:
a memory configured to store an address of the first device, an address of a second device, and at least one application; and
a processor configured to:
assign an auxiliary address, the auxiliary address being representative of the second device, the second device address being different from the first device address; and
access, by the at least one application of the first device, the second device by:
converting data having the auxiliary address as a destination address and to be transmitted to the second device to have the second device address as the destination address; and
converting data having the second device address as an origin address and received from the second device to have the auxiliary address as the origin address,
wherein a second device auxiliary address is assigned in a second device, the second device auxiliary address being representative of the first device, and
wherein the second device is configured to, by at least one application of the second device, access the first device by:
converting data having the second device auxiliary address as a destination address and to be transmitted to the first device to have the first device address as the destination address; and
converting data having the first device address as an origin address and received from the first device to have the second device auxiliary address as the origin address.

24. The first device of claim 23, wherein the processor is configured to:
send and receive data using the first device address to represent the first device;
request and receive another address that represents the first device; and
send and receive data using the another address to represent the first device.

25. The first device of claim 24, wherein the processor is configured to: inform at least one of the second device and other computers of the another address so that the at least one of the second device and other computers can use the another address to represent the first device.

26. A non-transitory computer readable recording medium having stored thereon instructions, which, when executed by a processor of a first device, execute a process for maintaining application connectivity of the first device, the process comprising:
assigning an auxiliary address in the first device, the auxiliary address being representative of a second device, the first device having a first device address, and the second device having a second device address different than the first device address; and
accessing, by at least one application of the first device, the second device by:
converting data having the auxiliary address as a destination address and to be transmitted to the second device to have the second device address as the destination address; and
converting data having the second device address as an origin address and received from the second device to have the auxiliary address as the origin address,
wherein a second device auxiliary address is assigned in a second device, the second device auxiliary address being representative of the first device, and
wherein the second device is configured to, by at least one application of the second device, access the first device by:
converting data having the second device auxiliary address as a destination address and to be transmitted to the first device to have the first device address as the destination address; and
converting data having the first device address as an origin address and received from the first device to have the second device auxiliary address as the origin address.

27. The non-transitory computer readable recording medium of claim 26, wherein the process comprises:
sending and receiving data using the first device address to represent the first device;
requesting and receiving another address that represents the first device; and
sending and receiving data using the another address to represent the first device.

28. The non-transitory computer readable recording medium of claim 27, wherein the process comprises:
informing at least one of the second device and other computers of the another address so that the at least one of the second device and other computers can use the another address to represent the first device.

* * * * *